(12) United States Patent
Baisley

(10) Patent No.: US 9,798,829 B1
(45) Date of Patent: Oct. 24, 2017

(54) DATA GRAPH INTERFACE

(71) Applicant: GOOGLE INC., Mountain View, CA (US)

(72) Inventor: Donald Edward Baisley, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 655 days.

(21) Appl. No.: 14/059,833

(22) Filed: Oct. 22, 2013

(51) Int. Cl.
G06F 17/30 (2006.01)

(52) U.S. Cl.
CPC .............................. *G06F 17/30958* (2013.01)

(58) Field of Classification Search
CPC .... G06F 17/278; G06F 17/247; G06F 17/243; G06F 17/30126; G06F 17/30241; G06F 17/30277; G06F 17/30389; G06F 17/30651; G06F 17/30825; G06F 17/30831; G06F 17/30958; G06F 17/30604
USPC .......................................................... 707/805
See application file for complete search history.

(56) References Cited

U.S. PATENT DOCUMENTS

| | | | |
|---|---|---|---|
| 6,993,533 B1 * | 1/2006 | Barnes | G06F 17/30554 |
| 7,502,770 B2 | 3/2009 | Hillis et al. | |
| 7,587,387 B2 | 9/2009 | Hogue | |
| 7,765,206 B2 | 7/2010 | Hillis et al. | |
| 7,769,579 B2 | 8/2010 | Zhao et al. | |
| 7,774,328 B2 | 8/2010 | Hogue et al. | |
| 7,792,837 B1 | 9/2010 | Zhao | |
| 7,925,610 B2 | 4/2011 | Elbaz et al. | |
| 8,122,026 B1 | 2/2012 | Laroco et al. | |
| 8,204,856 B2 | 6/2012 | Meyer et al. | |
| 8,315,849 B1 * | 11/2012 | Gattani | G06F 17/28 |
| | | | 704/10 |

(Continued)

FOREIGN PATENT DOCUMENTS

WO   2010085523 A1   7/2010

OTHER PUBLICATIONS

"Maltego Blog:CSV,XLS(X) import in Maltego 3.0.4", Maltego Blogspot (http://maltego.blogspot.com/2011/04/csvxlsx-import-in-maltego-304.html), Apr. 1, 2011, 3 pages.

(Continued)

*Primary Examiner* — Syed Hasan
*Assistant Examiner* — Saba Ahmed
(74) *Attorney, Agent, or Firm* — Brake Hughes Bellermann LLP

(57) ABSTRACT

Some implementations provide a user interface that allows non-technical users to import, create, and maintain a knowledge document. The knowledge document may include links to other knowledge documents or links to public data graphs. For example, a method may include generating data used to display tabular data to a user, a first column of the tabular data being associated with a first entity type and non-heading rows in the tabular data representing information for entities of the first entity type. The method may also include permitting the user to select a second column of the tabular data and provide a second entity type as an object type to be associated with a relationship represented by the second column. The method may include generating an entity in the knowledge document of the second entity type and linking an entity of the first entity type to the generated entity by the relationship.

23 Claims, 16 Drawing Sheets

(56) References Cited

U.S. PATENT DOCUMENTS

| | | | |
|---|---|---|---|
| 8,838,654 B1* | 9/2014 | Hannah | G06F 17/30294 707/803 |
| 2004/0181543 A1* | 9/2004 | Wu | G06F 17/30572 |
| 2005/0060647 A1* | 3/2005 | Doan | G06F 17/30557 715/205 |
| 2007/0300190 A1* | 12/2007 | Bier | G06F 17/278 715/862 |
| 2010/0106752 A1* | 4/2010 | Eckardt, III | G06F 17/30696 707/805 |
| 2010/0121839 A1 | 5/2010 | Meyer et al. | |
| 2010/0313157 A1* | 12/2010 | Carlsson | G06F 17/30604 715/769 |
| 2011/0234594 A1* | 9/2011 | Charles | G06Q 30/02 345/440 |
| 2012/0221581 A1* | 8/2012 | Narayanan | G06F 17/30958 707/748 |
| 2013/0066823 A1* | 3/2013 | Sweeney | G06N 5/02 706/50 |
| 2013/0238631 A1* | 9/2013 | Carmel | G06F 17/30604 707/742 |
| 2013/0268258 A1* | 10/2013 | Patrudu | G06N 5/02 704/2 |
| 2013/0346421 A1* | 12/2013 | Wang | G06F 17/278 707/748 |
| 2014/0059083 A1* | 2/2014 | Adams | G06F 17/30587 707/798 |
| 2014/0136555 A1* | 5/2014 | Jacob | G06F 17/30958 707/754 |
| 2015/0026212 A1* | 1/2015 | Fink | G06F 17/30864 707/774 |

OTHER PUBLICATIONS

Levallois, "Convert Excel spreadsheets and csv files into networks", Gephi Marketplace (https://web.archive.org/web/20131020125230/https://marketplace.gephi.org/plugin/excel-csv-converter-to-network/), Oct. 16, 2013, 5 pages.

Quercini, et al, "Entity Discovery and Annotation in Tables", EDBT/ICDT '13, Mar. 18-22, 2013, Genoa, Italy, 12 pages.

Mulwad, "DC Proposal: Graphical Models and Probabilistic Reasoning for Generating Linked Data from Tables", ISWC 2011, Part II, LNCS 7032, 2011, pp. 317-324.

Han, et al, "RDF123: from Spreadsheets to RDF", ISWC 2008, Oct. 26-30, 2008, 16 pages.

* cited by examiner employee

| employee Id | name | exempt | cost center | location | supervisor | direct reports |
|---|---|---|---|---|---|---|
| Alice | Alice Smith | Yes | Exec | B5 | | Bill, Fred |
| Bill | William Walker | Yes | Sales | B5 | Alice | |
| Carrie | Carrie Jones | Yes | Legal | C4 | | |
| Fred | Fred Jenkins | Yes | Engineering | A2 | Alice | Dan, Dotti |
| Dan | Dan Dillon | No | Engineering | C4 | Fred | |
| Dotti | Dorothy Ruth | No | Engineering | A2 | Fred | |

1005:
Label: direct reports
Computation: employees whose supervisor is this employee
Type of value: employee
Type of subject: employee
Fact template: The direct reports of the employee are ____.

1010: direct reports

FIG. 10 employee

| employee Id | name | exempt | cost center | location | supervisor | direct reports |
|---|---|---|---|---|---|---|
| Alice | Alice Smith | Yes | Exec | B5 | | Bill, Fred |
| Bill | William Walker | Yes | Sales | B5 | Alice | |
| Carrie | Carrie Jones | Yes | Legal | C4 | | |
| Fred | Fred Jenkins | Yes | Engineering | A2 | Alice | Dan, Dotti |
| Dan | Dan Dillon | No | Engineering | C4 | Fred | |
| Dotti | Dorothy Ruth | No | Engineering | A2 | Fred | | direct reports of the employee "Alice"

| employee Id | name | exempt | cost center | location | supervisor | direct reports |
|---|---|---|---|---|---|---|
| Bill | William Walker | Yes | Sales | B5 | Alice | |
| Fred | Fred Jenkins | Yes | Engineering | A2 | Alice | Dan, Dotti |

FIG. 11

DATA GRAPH INTERFACE

BACKGROUND

Many organizations and people store data in tabular format, such as in spreadsheets and databases. The data often represents real-world entities (people, places, things), facts about these entities, and relationships between the entities. While the facts and relationships may be intuitive to a human viewing the data, the system itself lacks knowledge of this information. Software systems that use or manage knowledge may use a data graph to represent real-world entities and relationships between entities to represent facts about the entities. The data graph may provide the semantic structure that allows a system to interpret data and acquire factual knowledge. Data graphs can allow a system to automatically relate and integrate new information with what is already known, easily aggregate and categorize information, and discover relationships. Such capabilities offer a more flexible and complete picture of the data. Because of this, knowledge-based systems often rely on data graphs. But building data graphs, including translating tabular data to a data graph format, has generally been the domain of technical users, e.g., individuals with a programming or information technology background, limiting the use of knowledge-based systems by conventional computer users.

SUMMARY

Some implementations provide a user interface that allows non-technical users without data modeling or semantic analysis expertise to import, create, and maintain a knowledge document. A knowledge document is a data graph that organizes information and information about the entity types and relationships in the data graph. The knowledge document may include links to other knowledge documents or links to public data graphs, such as Freebase™. The user interface may allow a user to import tabular data, for example in a spreadsheet or relational table, and build a data graph for a knowledge document based on the imported tabular data. The interface may enable a user to easily define new entity types, generate instances of the entity types, generate subtypes, establish relationships between entities, etc. When a link to another knowledge document or a public data graph is generated, the user interface allows the user to integrate facts from the outside source graph with facts and/or properties from the knowledge document in a single view.

One aspect of the disclosure can be embodied in a system that includes at least one processor, and memory storing a data graph that includes a plurality of first entities of a first entity type, wherein the first entity type has a first property of an alpha-numeric type. At least some of the first entities have respective alpha-numeric values for the first property. The memory also stores instructions that, when executed by the at least one processor cause the computer system to perform operations. The operations can include receiving a new entity type for the first property from a user and generating second entities having the new entity type, each second entity representing a unique alpha-numeric value for the first property from the respective alpha-numeric values. The operations also include, for a particular first entity of the plurality of first entities, generating a relationship in the data graph between the particular first entity and one of the second entities based on the alpha-numeric value of the first property for the particular first entity, and upon generating the relationship, removing the first property from the particular first entity.

The system can include one or more of the following features. For example, the first property may have a fact template, the fact template being automatically generated based on semantic analysis of a column heading of tabular data and values in the column. As another example, the memory may further store instructions that, when executed by the at least one processor, cause the system to receive a subtype from the user for the first entity type and a natural language description for the subtype, generate an entity in the data graph that represents the subtype, parse the natural language description to determine criteria for the subtype, and determine that first entities meeting the criteria are members of an extension of the subtype. As another example, the criteria may specify a property, the criteria may specify a relationship and an object entity, and/or the criteria may specify at least two properties and a logical operator.

In some implementations, the memory further stores instructions that, when executed by the at least one processor, cause the system to receive a subtype for the first entity type, generate an entity that represents the subtype, receive an indication that a particular first entity is an instance of the subtype, and generate a relationship in the data graph between the particular first entity and the entity that represents the subtype. In some implementations, the memory further stores instructions that, when executed by the at least one processor, cause the system to receive an existing entity type as the type for a second property, determine that a certain first entity has an alpha-numeric value for the second property that corresponds to an entity of the existing entity type, generate a relationship in the data graph between the certain first entity and the entity of the existing entity type, the relationship representing the second property, and remove the second property from the certain first entity.

In some implementations, the system may also include a user interface that generates information used to display the first entities, the information for each first entity including alpha-numeric values for the first entity for each associated property; and entities related to the first entity. In such implementations, the first entities may be displayed in rows and properties and relationships are displayed in columns and/or the entities related to the first entity may appear as links that enable the user of the user interface to initiate display of information for the related entities. In some implementations, the user interface further generates information used to display the entity types in the data graph and to select one of the entity types as the first entity type.

As another example, the memory may further store instructions that, when executed by the at least one processor, cause the system to receive a second entity type for a second property, the second entity type being an entity type from an external data graph and, for each of the plurality of first entities with a second alpha-numeric value for the second property, match the second alpha-numeric value to an entity in the external data graph that has the second entity type and generate a relationship in the data graph between the first entity and the entity in the external data graph. In some implementations, the system may include a user interface that generates information used to display the first entities, the information for each first entity including alpha-numeric values for properties associated with the first entity and entities related to the first entity, including the entities in the external data graph. In some implementations, the system may include a user interface that adds properties in the data graph for the entities in the external data graph.

In another aspect, a computer-implemented method includes generating, using at least one processor, data used to display tabular data to a user, a first column of the tabular data being associated with a first entity type and non-heading rows in the tabular data representing entities of the first entity type in a knowledge document and permitting the user to select a second column of the tabular data and provide a second entity type as an object type to be associated with a relationship represented by the second column. The method may also include generating, using the at least one processor, an entity in the knowledge document of the second entity type that represents a value in a non-heading row in the tabular data, linking an entity of the first entity type that is associated with a non-heading row to the generated entity by the relationship, and storing an updated knowledge document in a memory.

The method can include one or more of the following features. For example, the link may be associated with a value in the heading row of the second column, the second entity type may not exist prior to the user selecting the second column, and/or the method may include modifying a display of the tabular data responsive to storing the updated knowledge document so that values in the second column are selectable. In some implementations, the method may also include receiving a selection of a particular value in the second column and displaying relationships and object entities for an entity associated with the particular value.

As another example, the method may also include permitting the user to select a third column of the tabular data and provide the entity type as an object type to be associated with a relationship represented by the third column and, for each non-heading row, determining that the third column for the non-heading row has a value, identifying a second entity of the first entity type that corresponds to the value, and linking a first entity of the first entity type that is associated with the non-heading row to the second entity using the relationship represented by the third column. The method may also include storing updates to the knowledge document in the memory. As another example, the method may include receiving a natural language computation for a subtype, the subtype being associated with the first entity type, parsing the natural language computation to determine criteria for the subtype, determining a plurality of entities of the first entity type meet the criteria, and displaying the plurality of entities in a tabular display for the subtype.

In some implementations, the method may also include receiving an identification of the tabular data from the user, defining the first entity type based on an initially occurring column of data in the tabular data, generating the entities of the first entity type based on row values in the initially occurring column of data, generating properties associated with the entities of the first entity type based on row values in remaining columns of data, and storing the entities and their associated properties as the knowledge document. In some implementations the method may include permitting the user to add a new column to the tabular data by supplying a name and a natural language computation, the natural language computation identifying a particular relationship, parsing the computation to determine the particular relationship, determining that the computation specifies an inverse relationship, determining a plurality of entities that satisfy the inverse relationship for a second entity of the first entity type, and displaying representations for the plurality of entities as values for the new column in a row of the tabular display associated with the second entity of the first entity type. In some implementations, the method may also include permitting the user to add a new column to the tabular data by supplying a name and identifying a third entity type from a data graph distinct from the knowledge document and permitting the user to associate an entity from the data graph with an entity of the first entity type using a relationship represented by the new column.

In another aspect, a method includes storing a first data graph in memory of a computing device, the first data graph including a plurality of first entities of a first entity type, wherein the first entity type has one or more associated properties, a first property of the one or more properties having a text type, wherein at least some of the first entities have respective values for the first property. The method may also include receiving an entity type for the first property and determining that the received entity type is from a second data graph. For each of the plurality of first entities with a value for the first property, the method may include matching the value to an entity in the second data graph that has the received entity type and generating a relationship in the first data graph between the first entity and the entity in the second data graph.

The method can include one or more of the following features. For example, the method may include receiving a new property for association with the entity type from the second data graph, receiving a value for the new property associated for a particular entity in the second data graph, and storing the value for the new property as part of the first data graph, wherein the second data graph is not aware of the new property or the value for the new property. As another example, the method may include generating data used to display property values associated with the entity from the second data graph and the value for the new property.

In one general aspect, a computer program product embodied on a non-transitory computer-readable storage device includes instructions that, when executed by at least one processor, cause a computing device to perform any of the disclosed methods, operations, or processes. In another general aspect, implementations include a system and/or method for identifying and defining a potential new entity and facts about the new entity using graph reconciliation, substantially as shown in and/or described in connection with at least one of the figures, as set forth more completely in the claims.

One or more of the implementations of the subject matter described herein can be implemented so as to realize one or more of the following advantages. As one example, a non-technical user may generate a data graph from tabular data, enabling the non-technical user to take advantage of knowledge-based applications, such as query reasoning, rule-based decision making, logic-based validation, etc. The user interface eases a transition from tabular data that lacks explicit semantic structure to a data graph with explicit semantic structure. The user interface and underlying data graph enables a non-technical user to glean richer semantic content from existing data. The user interface may enable the user to capture semantic structure in tabular data and define the structure using vocabulary that already exists in the tabular data. Once the user has transitioned the data from tabular format to a data graph, the system may provide important facts from other data graphs in combination with the user's own data, assisting the user in obtaining a more complete picture of the data and to see the big picture that is the union of his own facts together with facts from other sources.

The details of one or more implementations are set forth in the accompanying drawings and the description below. Other features will be apparent from the description and drawings, and from the claims.

BRIEF DESCRIPTION OF DRAWINGS

FIG. 10 illustrates an example of a property that is a computed relationship, consistent with disclosed implementations.

FIG. 11 illustrates a user interface that allows a user to step into a list of document entities, consistent with disclosed implementations.

Like reference symbols in the various drawings indicate like elements.

DETAILED DESCRIPTION

Figure 1:
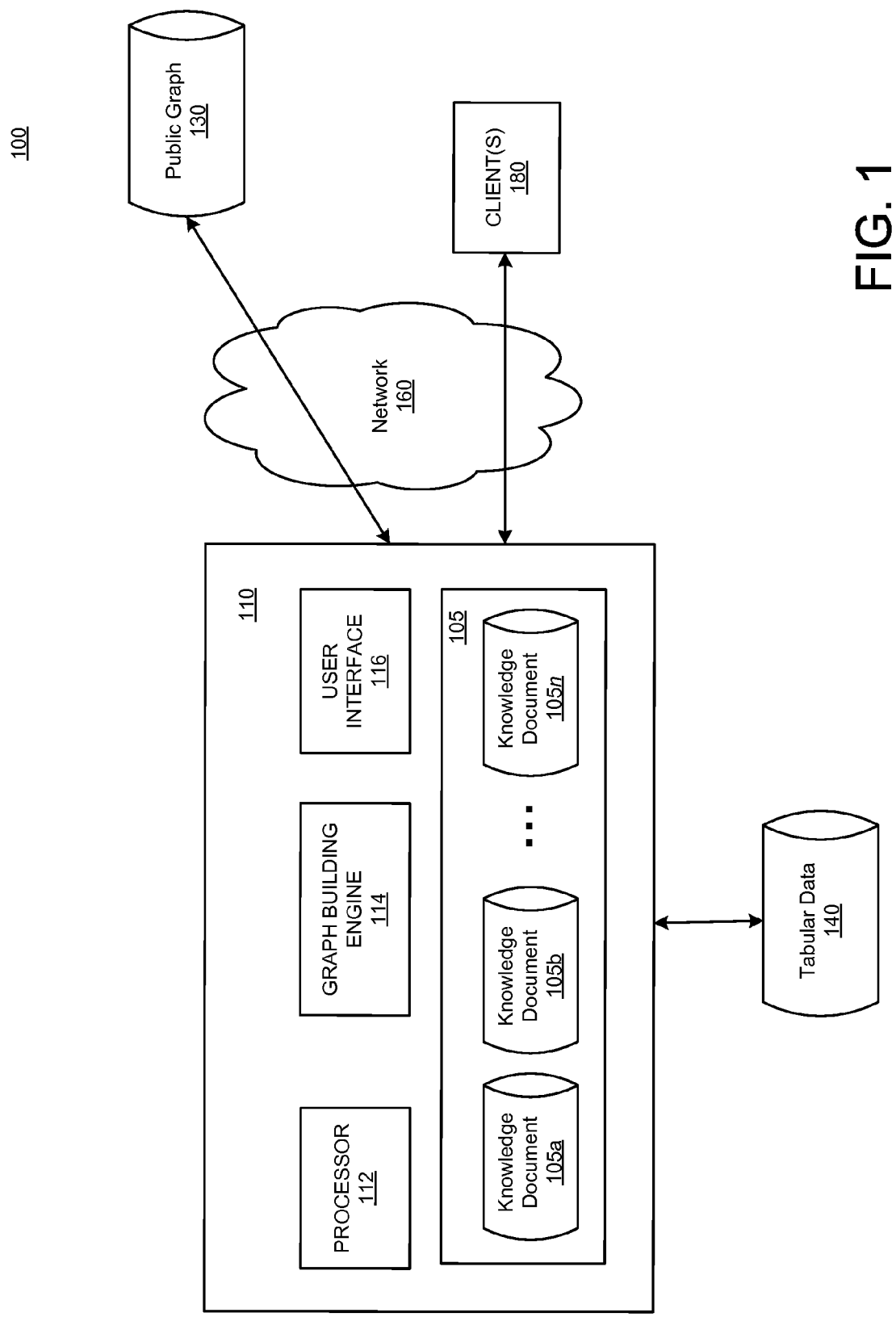
FIG. 1 illustrates an example system in accordance with some implementations.

FIG. 1 is a block diagram of a system 100 in accordance with an example implementation. The system 100 may be used to implement a user-friendly interface for importing, defining, manipulating, and viewing graph-based data. The depiction of system 100 in FIG. 1 may be a cloud-based system for generating and maintaining a knowledge document. Other configurations and applications of the described technology may be used. For example, the system may be a client-based system or a traditional computing device that may not have network connectivity.

Figure 15:
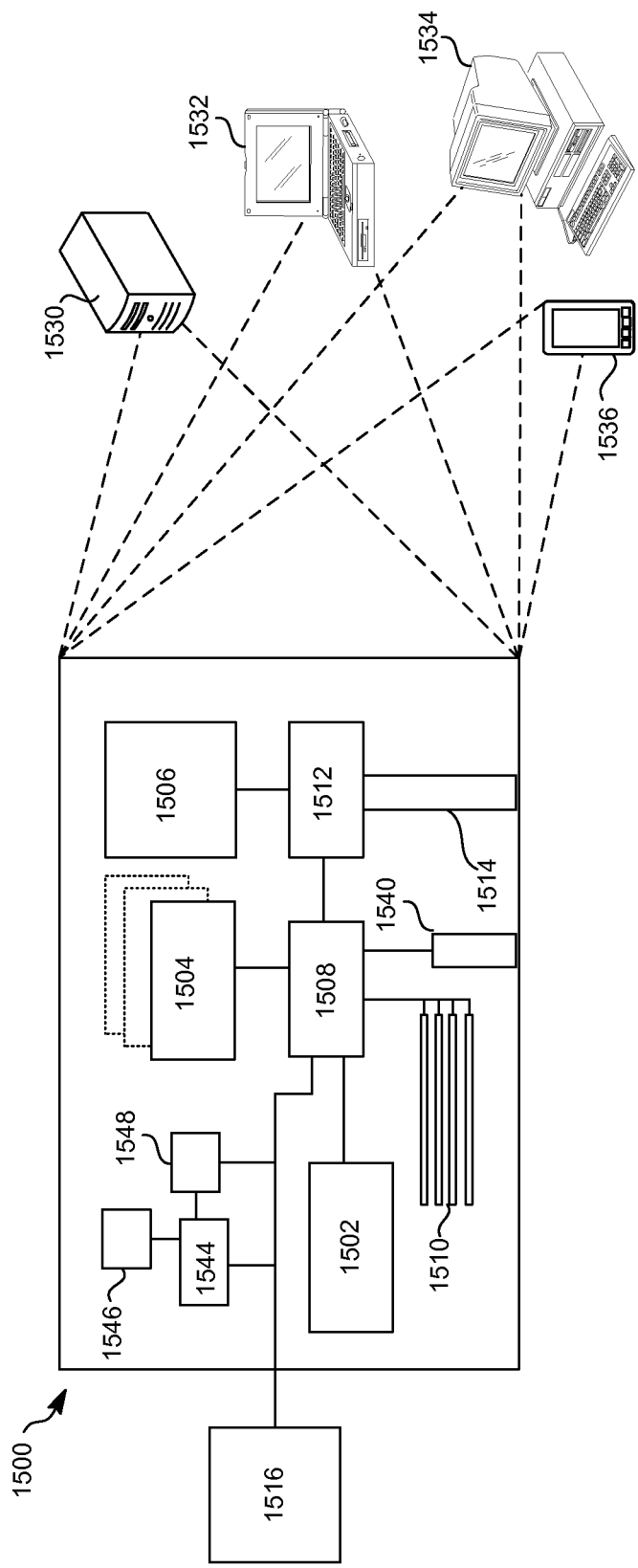
FIG. 15 shows an example of a computer device that can be used to implement the described techniques.
Figure 16:
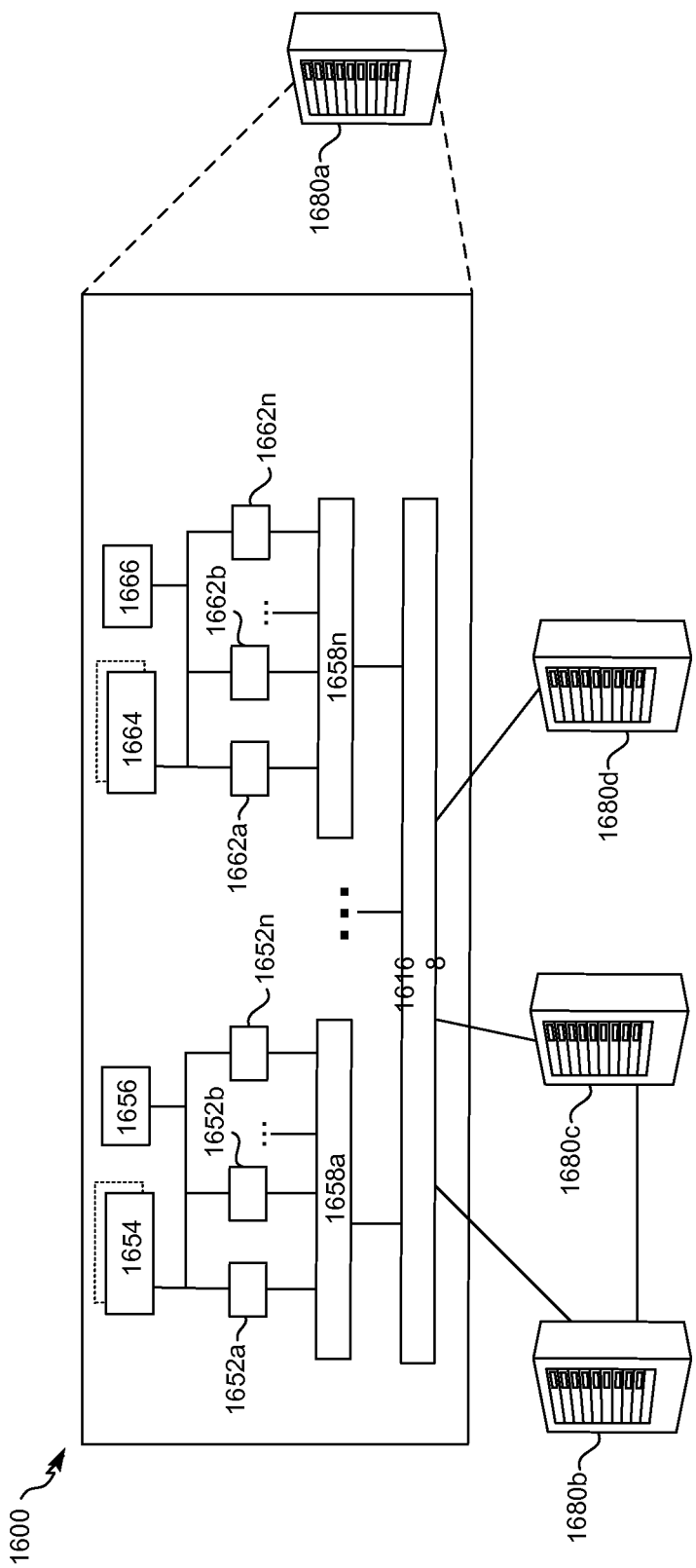
FIG. 16 shows an example of a distributed computer device that can be used to implement the described techniques.

The system 100 may be a computing device that takes the form of a number of different devices. For example, the system may be a standard server, a group of such servers, or a rack server system and a user of the system may send information to and receive information from client 180. In some implementations, the system 100 may be a distributed system implemented in a series of computing devices, such as a group of servers. In some implementations, system 100 may be a computing system sharing components, such as processors and memories, with other systems. In some implementations, the system 100 may be implemented in a personal computer, for example a desktop or laptop computer. The system 100 may be an example of computer device 1500, as depicted in FIG. 15 or computer device 1600, as depicted in FIG. 16.

The system 100 may include computing device 110. Computing device 110 may include one or more processors 112 configured to execute one or more machine executable instructions or pieces of software, firmware, or a combination thereof that cause the computing device 110 to perform operations. The operations may include receiving instructions and data from the user, translating tabular data to a data graph in a knowledge document, and generating, storing, and maintaining one or more knowledge documents 105. Although not shown in FIG. 1 for the sake of brevity, in some implementations, the computing device 110 may be one or more separate computing devices, such that knowledge document 105a is maintained by a first set of computing devices and knowledge document 105b is maintained by a second set of computing devices, etc.

For example, the system 110 may include graph building engine 114 and user interface 116. User interface 116 may enable the computing device 110 to receive data and instructions from one or more clients 180. The data and instructions may be from a user and represent actions to be performed by the graph building engine 114. For example, the user interface 116 may be a graphical user interface (GUI) that allows a user to view data from one or more of knowledge documents 105 and interact with the data to modify and expand the data graph represented by the knowledge document 105. It is understood that the user interface 116 may communicate directly with a display or may send data used by a display of client 180. In one implementation, the user interface 116 may generate a tabular-based GUI for a knowledge document 105. Thus, although the underlying data is a graph and not tabular, the user interface 116 may present the data graph in a GUI familiar to the user because of exposure to spreadsheet GUIs. The user interface 116 may actually display the information to the user or the user interface 116 may generate data that is sent to a computing device of the user, such as client 180, and displayed at the user's computing device. In either case, the user interface 116 may be considered to display information. In some implementations the user interface 116 may display entities of the same entity type in a tabular format. The rows of the table may represent a particular instance of the entity type and the columns may represent properties and other entities related to the instance in the row. The user interface 116 working with graph building engine 114 may enable a user to add properties to instances of an entity type, to generate new entity types and instances of the new entity type, to display and modify relationship metadata, etc., as will be explained in more detail below.

Graph building engine 114 may respond to instructions and data received using user interface 116. For example, the graph building engine 114 may import tabular data 140, generate entities in a knowledge document 105 from non-heading rows in the tabular data, translate columns into properties and relationships between entity instances and the properties, generate additional entity properties, generate additional entity types, generate and modify relationships, generate entity categories, link the knowledge document 105 to one or more public data graphs 130, determine data from the knowledge document 105 to display, etc.

The system 100 may include one or more knowledge documents 105, such as knowledge document 105a, 105b, and 105n. A knowledge document is a data graph that stores information in the form of nodes and edges, with nodes being connected by edges. The node in a data graph may represent a document entity or a property entity. An entity can be a person, place, item, idea, topic, abstract concept, concrete element, other suitable thing, or any combination of these. A document entity in the graph may be related to any quantity of other entities by edges, which may represent relationships between entities. For example, the data graph may have an entity that corresponds to an employee John Smith and the data graph may have a supervises relationship between the John Smith entity and entities representing other employees or contractors that report to John Smith.

Facts about a document entity may be represented by links with other document entities or by links with property entities. A property entity is an entity in the knowledge document that has an alpha-numeric type, such as text, number, currency, weight, etc. Property entities are linked to one document entity and therefore have only one relationship or link, the relationship that links them back to their associated document entity. Property entities and their associated relationship may be referred to as a property of an entity. Document entities on the other hand can have any number of connections with other document entities and with any number of property entities. Document entities in the knowledge document may have a user-defined entity type rather than an alpha-numeric type. The entity type may define the valid relationships and properties for instances of the entity type. For example, an employee entity type may have the properties of name, id, exempt status, salary, etc., while a cost center entity type may have the properties of budget, name, id, etc. The John Smith employee entity type thus has an associated name, exempt status, salary, etc. In some implementations, the facts may be stored as triples in the knowledge document. A triple may include a subject entity, a relationship, and an object. The object may be a property entity or another document entity. The triple may also include other information.

The relationships in the knowledge document 105 may have metadata indicating the characteristics of the nodes it connects. Relationship objects may be property entities or document entities. For example, a name relationship may indicate that the subject is an employee entity and the object has a text type, which means the object is a property entity. A supervisor relationship may indicate that the subject and object are both employee entities. In some implementations, the object entity of a relationship may be an entity in another data graph. For example, knowledge document 105a may have a location relationship where the object is an entity type in knowledge document 105b. This type of relationship may link one knowledge document to another knowledge document or to a public data graph 130. Once linked in this manner, the system may display content from both sources in one view, allowing a user to add private content to public entities. Relationships metadata may also indicate whether an edge is calculated and may include a fact template. A fact template is a natural language template describing the fact. For example, the supervisor relationship may have a fact template that indicates A is supervised by B, where A is replaced by the subject entity name and B is replaced by the object entity name when a particular relationship is displayed to the user. It is understood that the knowledge document 105 may include other relationship metadata, for example a label, an identifier, a source indicator, etc.

In some implementations a data graph or a knowledge document may be indexed. For the purposes of this application, reference to a data graph, such as the knowledge document 105 may be considered reference to the index for the graph and vice versa. Also for the purposes of this application, entity may refer to a physical embodiment of a person, place, or thing or a representation of the physical entity, e.g., text, or other information that refers to an entity. For example, an entity may be the person John Smith or an abstract concept that refers to John Smith.

The system 100 may include tabular data 140. Tabular data 140 may be in any form, such as a spreadsheet, a <table> tag in Hypertext Markup Language (HTML), a database table, etc. The tabular data 140 may be imported from a client 180 or may be stored in a library or other repository accessible via computing device 110. The tabular data 140 may have column headings and rows of data. The column headings may be heading spreadsheet cells, the first row of a spreadsheet, identified by <th> HTML tags, column definitions in a database, etc. Tabular data 140 may be stored on a tangible computer-readable storage device, for instance disk, flash, cache memory, or a combination of these, configured to store data in a semi-permanent or non-transient form.

The system 100 may include public graph 130. Public graph 130 may be a data graph similar to the knowledge document 105, but the public graph 130 may be generally accessible and updatable by members of the public. An example of a public graph 130 is the Freebase™ graph, available at www.freebase.com. The entity types and instances in a public graph 130 may be available to various users. The graph building engine 114 and/or the user interface 116 may be capable of accessing the public graph 130 to incorporate information from the graph into a GUI generated by user interface 116. Thus, data in public graph 130 may be augmented with data from one or more of knowledge documents 105.

The computing device 110 may be in communication with the client(s) 180 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the computing device 110 may communicate with and transmit data to/from clients 180 and to access public graph 130. In some implementations, tabular data 140 may be obtained via network 160.

Figure 2:
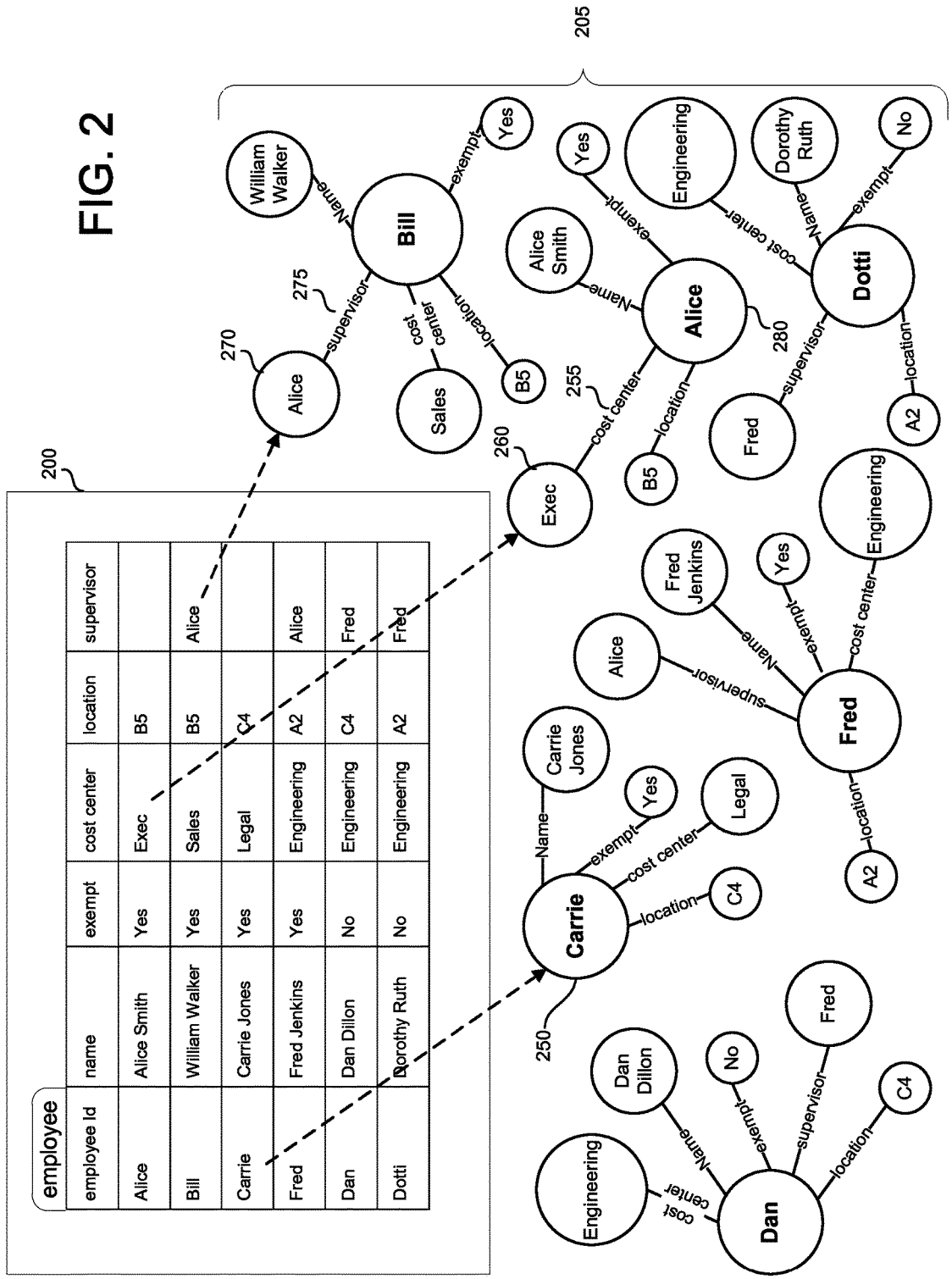
FIG. 2 illustrates an example of a user interface for displaying entities of a common entity type in a knowledge document, consistent with disclosed implementations.

FIG. 2 illustrates an example of a user interface 200 for displaying entities of a common entity type in a knowledge document from tabular data, consistent with disclosed implementations. A user interface, such as user interface 116 of FIG. 1, may generate information used to display user interface 200 in responding to a request to import tabular data into a data graph, for example a knowledge document. In the example of FIG. 2, a user has submitted an employee table for import. The employee table may be a worksheet of a spreadsheet, a table in a database, or any other type of tabular data. A graph building engine, such as engine 114 of FIG. 1, may translate the data in the table into entities and relationships in a data graph 205 of a knowledge document. The graph building engine may use a worksheet name or a table name as the identifier of an entity type for rows of the table. In the example of FIG. 2, the worksheet is named "Employees." Thus the graph building engine may generate an "employee" entity type. The graph building engine may use one of the columns of the tabular data as an entity identifier. Each value in the column uniquely identifies a single entity that is an instance of the entity type. The system may permit a user to specify the column or the system may use a first column, which is assumed to uniquely identify each entity. In some implementations, a combination of columns may be used to uniquely identify instances of an entity type, and the system may permit the user to choose the combination of columns. The system may generate an entity of the employee entity type for each row with a unique value in the selected column(s). In the example of FIG. 2, the graph building engine uses the first column and generates six employee entities; Alice, Bill, Carrie, Fred, Dan, and Dotti. These entities are illustrated in graph 205 as circles with diagonal lines, for example entity 250 of FIG. 2. It is understood that graph 205 is illustrated using circles and lines for ease of explanation and that the data used to generate the visual representation in FIG. 2 may be physically stored using other formats, including the use of triples.

The graph building engine may add a property relationship to employee entities for each column beyond the first column. In other words, for each column beyond the first column that has a valid value, the graph building engine may add one property relationship and a corresponding property entity to the entity represented by the first column of the row. For example, in the first non-header row, e.g., the row for Alice, the tabular data of FIG. 2 has the value 'Exec' under the 'cost center' column. Accordingly, the system may generate a property relationship of cost center 255 between the Alice document entity and a property entity 260 of Exec. As another example from FIG. 2, the system generates a supervisor relationship 275 between the employee entity Bill and the Alice property entity 270. The graph building engine may use the column heading to represent a name or identifier of the property relationship. A property relationship is an edge that links a document entity to a property entity. By using the column headings to name the relationships, the system uses the vocabulary of the knowledge document owner to capture semantic structure. As illustrated in FIG. 2, the document entities are connected only to their own property entities and are not connected to other document entities.

In connecting document entities to property entities, the system may generate relationship metadata for the relationships. The relationship metadata may include a name or identifier for the relationship, the subject entity type, the expected type of object node, a natural language fact template for the relationship, a source (e.g., the file name of the tabular data), a computation, etc. The knowledge document may be a directed graph, meaning that the relationship goes from a subject node to an object node. Thus, the subject type may be an indication of the entity type expected for the subject of the relationship. Thus, some relationship may be valid only for certain entity types. For example, a born in relationship may make sense for instances of the employee entity type, but not for cost center entity types. The object of a relationship, also referred to as the value of the relationship, may be entity connected to the subject entity by the relationship. The value may be a property entity or a document entity. Property entities may be of an alphanumeric type, such as integer, text, currency, date, flag, etc. The value type of a relationship indicates the expected type of the object of the relationship.

The fact template may be a natural language template for displaying the semantic meaning of the triple represented by the subject, relationship, and object. For example, the exempt relationship may have a flag object type, which means the property has a true/false or yes/no value. The fact template for the exempt relationship may be "Employee A is B exempt," where A is replaced by the employee identifier and B is replaced by "not" when the flag indicates false or no. As another example, the location relationship may have a fact template of "The location of employee A is B," etc. Fact templates can be used to confirm or alter the system's interpretation of a column heading with respect to a subject entity and the value for that subject entity in the column. The system's understanding may be used in automated communication between the system and human users. For example, the fact templates can be used in queries and other aspects of the system to display a property of an entity or a relationship between entities as a sentence written in the language of the user. The graph building engine may generate the fact templates using semantic analysis of the column headings, table name and values in the column.

Once the graph generation engine has generated a graph, e.g., in a knowledge document, for the tabular data, the system may generate a user interface, such as interface 200, to display the data. Although the data displayed in interface 200 is in tabular format, the data populating the interface is graph based; for example graph 205. This distinction allows the system to use user interface 200 to further define and link the knowledge document.

Figure 3:
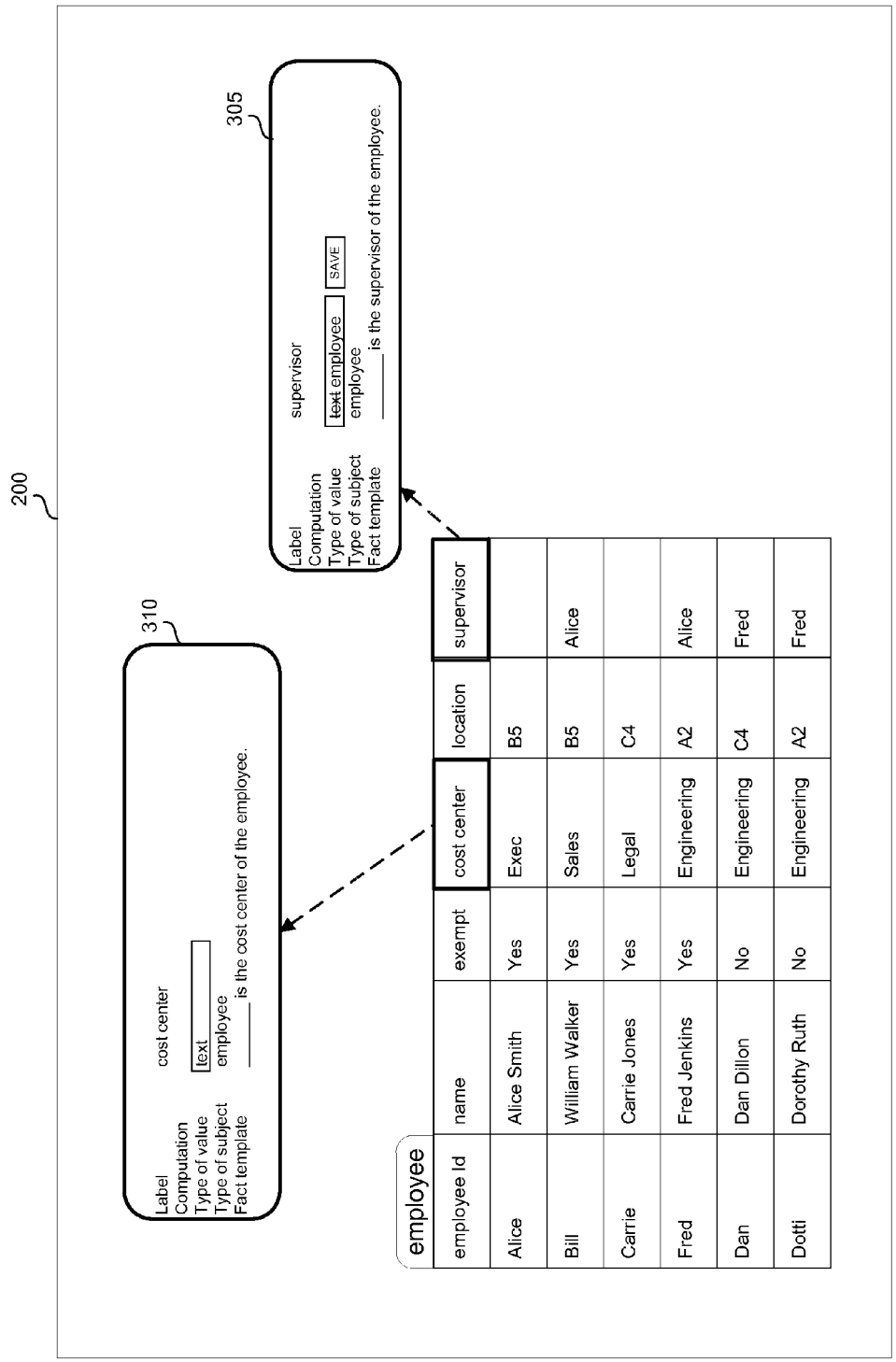
FIG. 3 illustrates an example of a user interface for converting property entities to entities in the knowledge document, consistent with disclosed implementations.

FIG. 3 illustrates an example of a user interface for converting property entities to document entities in the knowledge document, consistent with disclosed implementations. In the example of FIG. 3, the column headings of the tabular display in user interface 200 may be controls that can be selected by a user. For example, if the user selects the cost center column heading, the system may generate another user interface, such as window 310. Window 310 may be a pop-up window, a side-bar window, a separate tab, a separate window, etc. The window 310 may display the relationship metadata for the selected column heading. The window 310 may allow a user to modify the metadata.

For example, if a user selects the supervisor column heading, the system may generate window 305. The user may then delete the value type of "text" and replace it with a value type of "employee," and select the 'save' control. The system may know that employee is not a valid alphanumeric type, but that employee is a valid entity type. By supplying a valid entity type, the user may use window 305 to tell the system to connect the entities in the knowledge document using the supervisor relationship.

Figure 4:
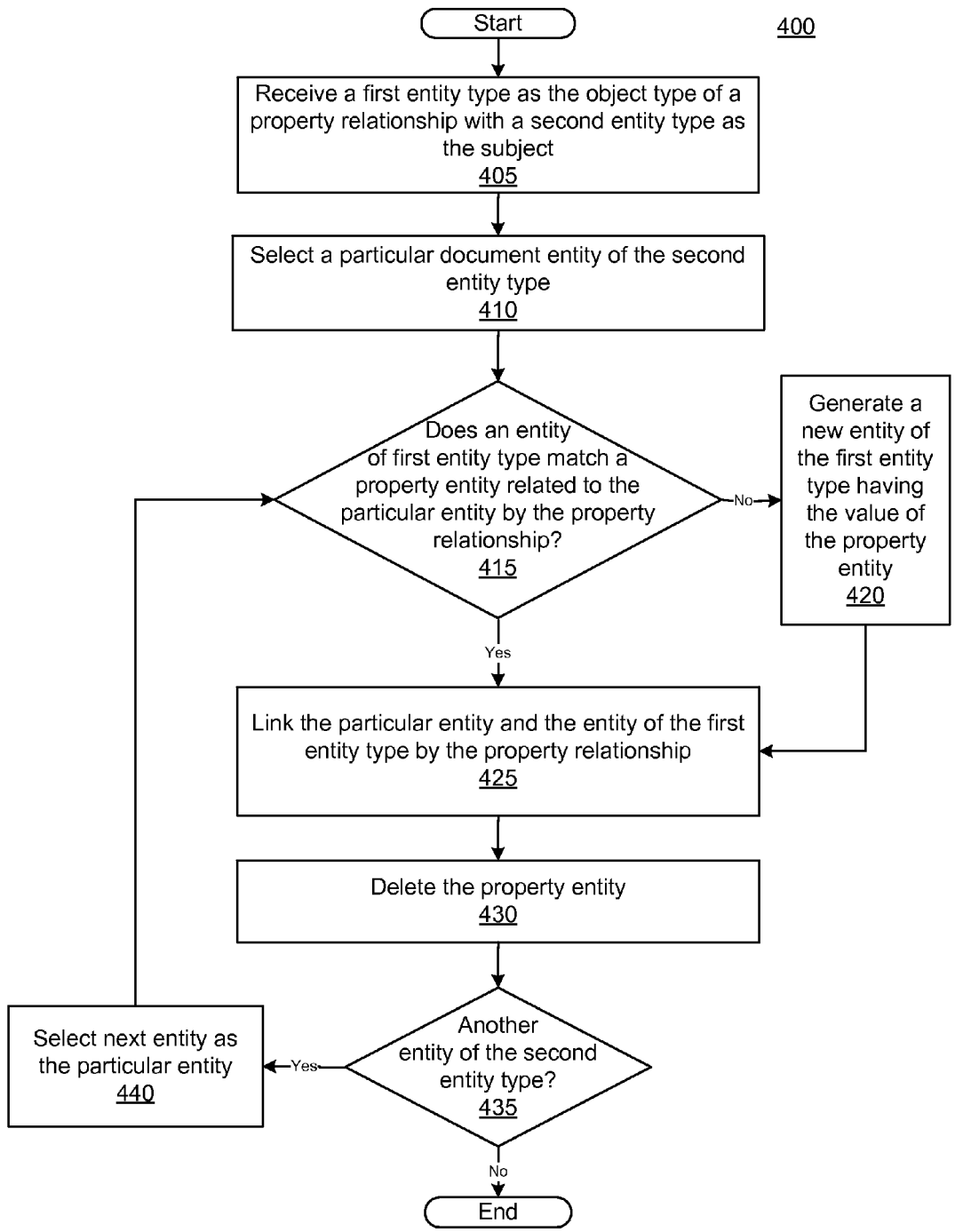
FIG. 4 illustrates a flow diagram of an example process for converting property entities to an existing entity type in the knowledge document, in accordance with some implementations.

FIG. 4 illustrates a flow diagram of an example process 400 for converting property entities to an existing entity type in the knowledge document, in accordance with some implementations. Process 400 may be performed by a graph building engine, such as graph building engine 114 of FIG. 1, in response to receipt of a new value type for an object type of a relationship via the user interface, such as interface 200. For example, the user may enter employee as the object type for a supervisor relationship via window 305 of FIG. 3. In response, the system may receive the new object type, e.g., "employee," and determine that employee is an existing entity type, e.g., the entity type of entities Alice, Bill, Carrie, Fred, Dan, and Dotti of FIG. 2. Thus, the system receives a first entity type as the object type (405). In response, the system may convert the supervisor properties to relationships between employee entities. For example, the system may select a particular entity of the second entity type, e.g. the entity type of the subject of the relationship (410). In the example of FIG. 3, the relationship is the supervisor relationship of window 305. The supervisor relationship has an employee entity as its subject type, so the system may select a particular employee entity with a supervisor relationship, for example, Bill.

Figure 5:
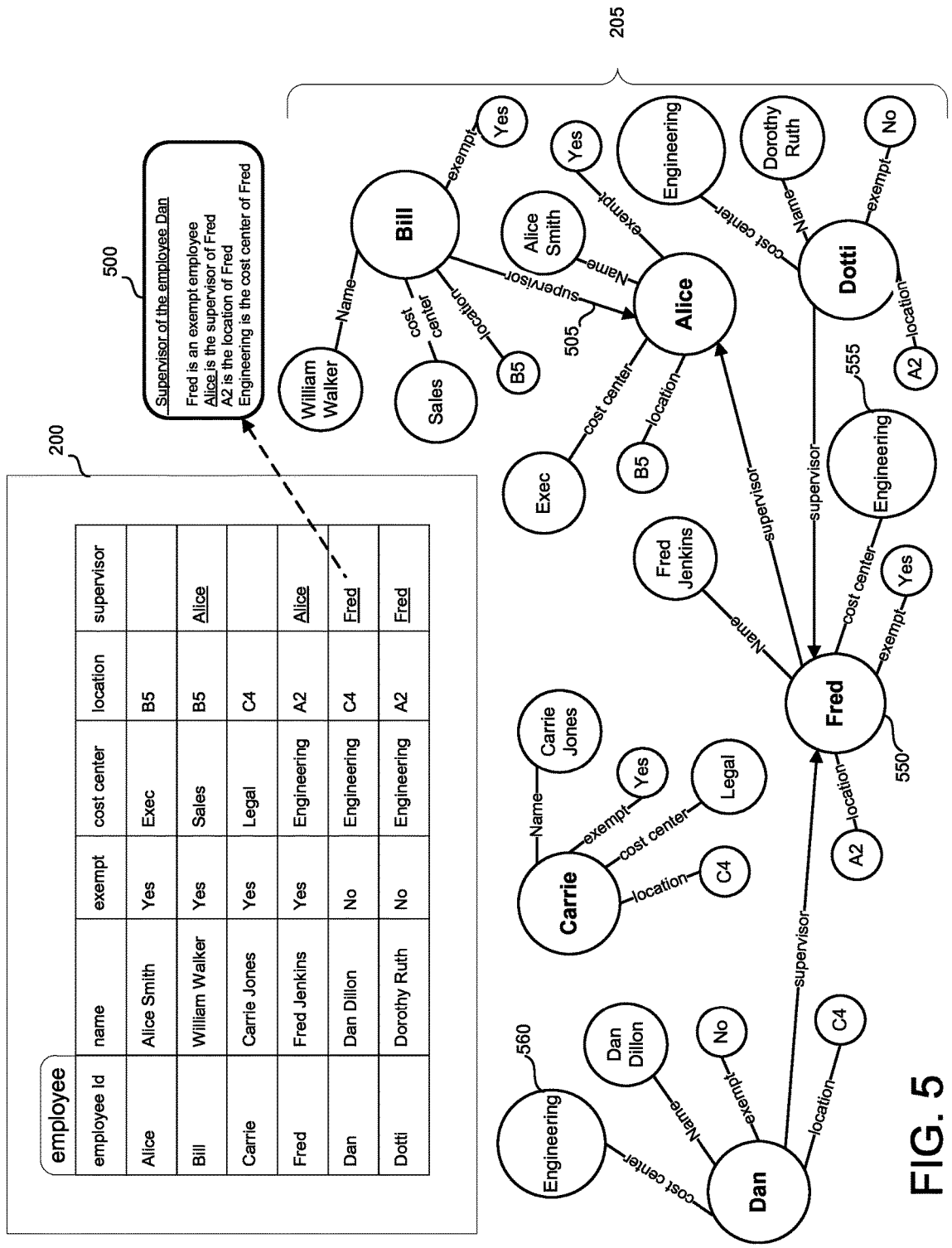
FIG. 5 illustrates an example of a user interface displaying a relationship between related entities, consistent with disclosed implementations.

The system may try to locate a document entity of the first entity type that matches a property entity related to the particular entity by the property relationship (415). In the example of FIG. 3, Bill is the particular entity and supervisor is the property relationship. The system may therefore find the property entity linked to Bill by the supervisor relationship. In the example of FIG. 3, this is the Alice property entity. The system may look for an employee entity that matches 'Alice.' If the system does not find a matching entity (415, No), in some implementations, the system may generate an entity of the first entity type (420). This new entity may be given the value of the property entity linked by the property relationship. For example, if Alice did not already exist, the system may generate the Alice entity. But in the example above, the system locates the Alice employee entity 280 illustrated in FIG. 2 (415, Yes). The system may then link the particular entity to the document entity of the first entity type by the property relationship (425). For example, the system may link the entity Bill with the entity Alice using a supervisor relationship. This new relationship is illustrated as the relationship 505 in the data graph 205 illustrated in FIG. 5. The system may then delete the property entity and its relationship to the particular entity (430). For example, the property entity of Alice is replaced by the employee entity Alice. The data graph 205 of FIG. 5 illustrates this because the Bill entity no longer includes the Alice property entity 270 and the supervisor relationship 275 illustrated in FIG. 2. Instead, the supervisor relationship 505 goes to the Alice employee entity 280.

The system may repeat steps 415 through 430 for all entities of the second entity type (435). When all entities of the second entity type (e.g., all employee entities) have been examined (435, Yes), process 400 ends. In the example of FIGS. 2 and 5, process 400 results in the property entities representing supervisors being deleted and the supervisor relationship linking employee entities rather than an employee entity and a property entity. Process 400 thus simplifies the graph, connects the nodes, and enables the system to derive further information about an employee's supervisor. For example, from the graph of FIG. 2 it was not apparent that Bill's supervisor was in the Exec cost center, but this is made apparent in the graph of FIG. 5. Furthermore, the user interface used to make the connections is intuitive.

FIG. 5 illustrates an example of a user interface displaying a relationship between related entities, consistent with disclosed implementations. The user interface 200 of FIG. 5 illustrates how the system may display document entities and properties differently. For example, in the interface 200 of FIG. 5, the values displayed for the supervisor column are underlined, indicating that a user may select the value. Of course, the system may use other indications that the user can select the value, such as an additional icon, a blank checkbox or radio button, etc., and implementations are not limited to underlining. The indication that the value can be selected may represent that the values are document entities in the data graph and not just properties. In the user interface 200 of FIG. 5, a user selecting one of the values in the "supervisor" column may cause the system to display another window with facts from the knowledge document about the entity. The facts may be displayed in a tabular format, similar to a row of the user interface 200, or may be in a natural language format, for example using the fact templates of the relationships for the selected entity. For example, if a user selects the "Fred" link from user interface 200, the system may generate an interface 500 that displays the facts about the Fred entity. In some implementations, any document entities in the interface 500 may also include an indication that the text is selectable by the user to display facts about the document entity. For example, in interface 500, "Alice" is also a link the user can select and, if selected, display facts about the Alice entity.

Figure 6:
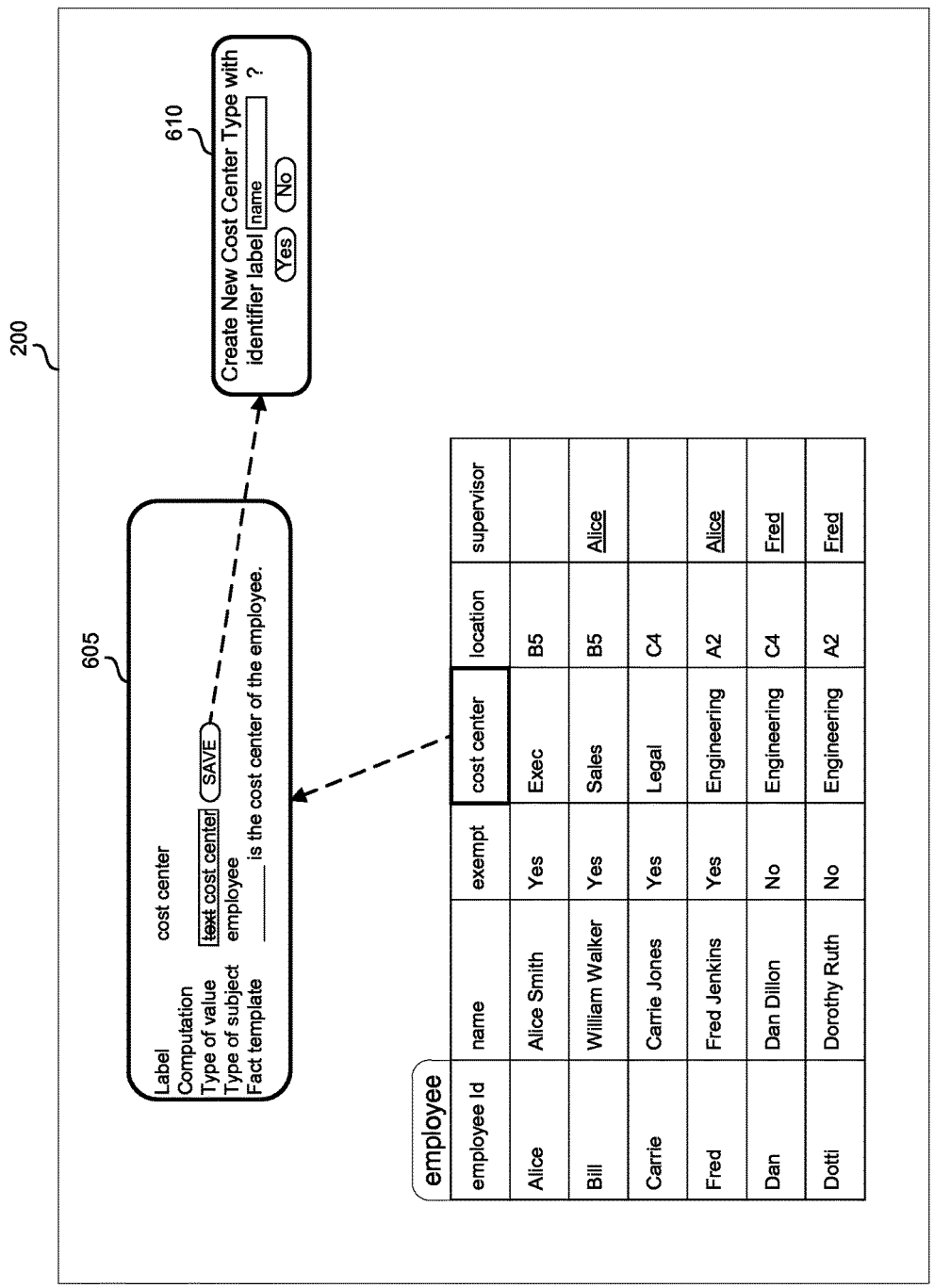
FIG. 6 illustrates an example of a user interface for converting property entities to entities of a new entity type in the knowledge document, consistent with disclosed implementations.

Instead of entering an existing entity type as the object type of a relationship, the interface 200 may also accept new entity types. FIG. 6 illustrates an example of a user interface for converting property entities to entities of a new entity type in the knowledge document, consistent with disclosed implementations. The system may generate the user interface 605 when a user selects a column heading in the tabular display part of interface 200. The column headings may represent relationships in the knowledge document. The information in interface 605 may represent relationship metadata for the selected relationship. In the example of FIG. 6, the user has selected the cost center column heading, so interface 605 includes metadata for the cost center relationship from the graph 205. The user may change the object type, labeled "type of value," from "text" to "cost center," as illustrated in FIG. 6. When the user selects the 'save' control, the system may determine that "cost center" is not a known alpha-numeric property type and not a known entity type. The system may then generate another interface 610 that confirms that the user wants to create a new entity type. The new interface 610 may allow the user to enter an identifier label for the new entity type and confirm that the new type is to be created.

Figure 7:
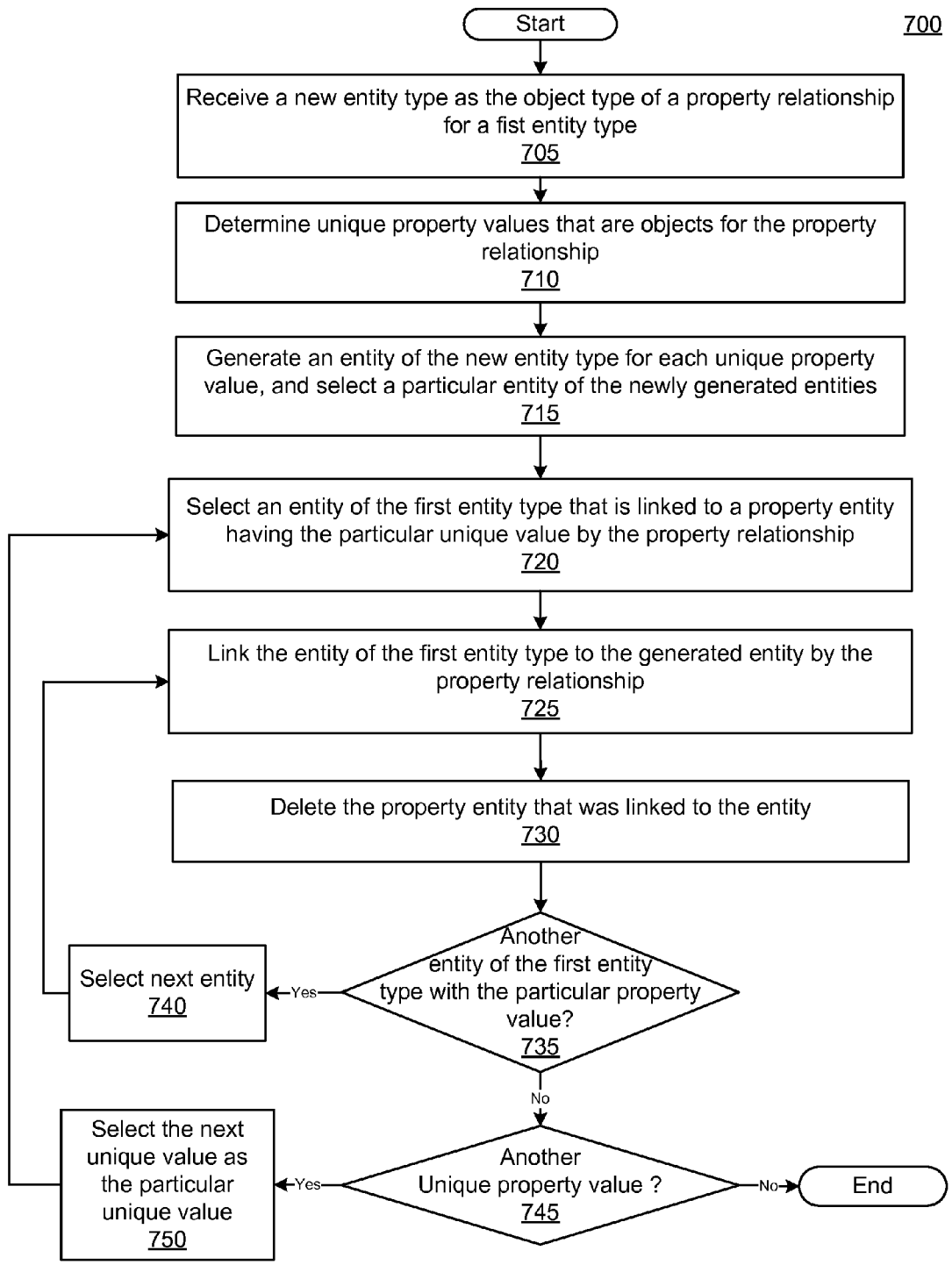
FIG. 7 illustrates a flow diagram of an example process for converting property entities to entities of a new entity type in the knowledge document, in accordance with some implementations.

FIG. 7 illustrates a flow diagram of an example process 700 for converting property entities to entities of a new entity type in the knowledge document, in accordance with some implementations. Process 700 may be performed by a graph building engine, such as graph building engine 114 of FIG. 1, in response to receipt of a new value type for a relationship via the user interface, such as interface 200. For example, the user may enter cost center as the object type and the system may determine that an entity type of cost center does not yet exist. Thus, the system has received a new entity type as the object type of a relationship between a property entity and entities of a first entity type (705). In response, the system may determine the unique values of the property entities that are linked to document entities of the first entity type via the relationship (710). For example, the system may determine the unique values of the column represented by the selected relationship. In the example of FIG. 6, the user selected the cost center relationship, so the system may determine that the unique values are Exec, Engineering, Legal, and Sales. The system may generate a new document entity in the knowledge document for each of the unique values (715). Using the example of FIG. 6, the system generates four entities, an Exec entity, an Engineering entity, a Legal entity, and a Sales entity. Each entity is of the cost center entity type. Thus, the system has generated a new valid entity type and instances of the entity type. The system may then convert the relationships between entities of the first entity type and property entities to relationships between entities of the first entity type and the second entity type. For example, the system may connect employee entities with the newly created cost center entities by the cost center relationship, deleting property entities that were linked to the employee entities by the cost center relationship.

For example, the system may select a particular entity of the new entity type (715) and look for an entity of the first entity type that is linked to a property entity that matches the particular entity (720). The system may link the entity of the first entity type to the particular entity using the relationship used to connect the entity of the first entity type to the property entity (725) and then delete the property entity (730). In the example of FIGS. 5 and 6, the system may select the Engineering document entity and locate the Fred document entity 550 in graph 205, which has a cost center relationship with an Engineering property entity 555. The system may link Fred to the Engineering document entity, illustrated as node 850 in FIG. 8, using the cost center relationship and delete the Engineering property entity 555. The system may determine whether another document entity of the first entity type is also linked to a property entity matching the selected entity (735). If so (735, Yes), the system may select another first entity (740) and repeat steps 725 and 730, linking the other first entity to the selected entity. For example, the system may determine that the Dan entity of FIG. 5 is also connected to an Engineering property entity 560, may link Dan to the Engineering document entity 850, and delete the Engineering property entity 560, as illustrated in FIG. 8.

When all entities of the first entity type that are connected to property entities matching the particular entity are processed (735, No), the system may select another unique property value that represents another document entity of the second entity type (745, Yes). For example, the system may select the Legal entity (750), and may repeat steps 720 to 745 using the Legal entity. When all newly generated entities have been processed (745, No), process 700 has completed. FIG. 8 illustrates the graph 205 of FIG. 5 after the conversion of the cost center property entities to document entities of a cost center entity type. From FIG. 8 it is apparent that the employee entities are now connected to common cost center document entities, rather than being associated with individual cost center properties. In some implementations the appearance of the values in the cost enter column of tabular user interface 805 may change to indicate that the values represent document entities and not just properties. For example, the values may be selectable controls that allow a user to select a value and bring up details for the selected entity.

Figure 8:
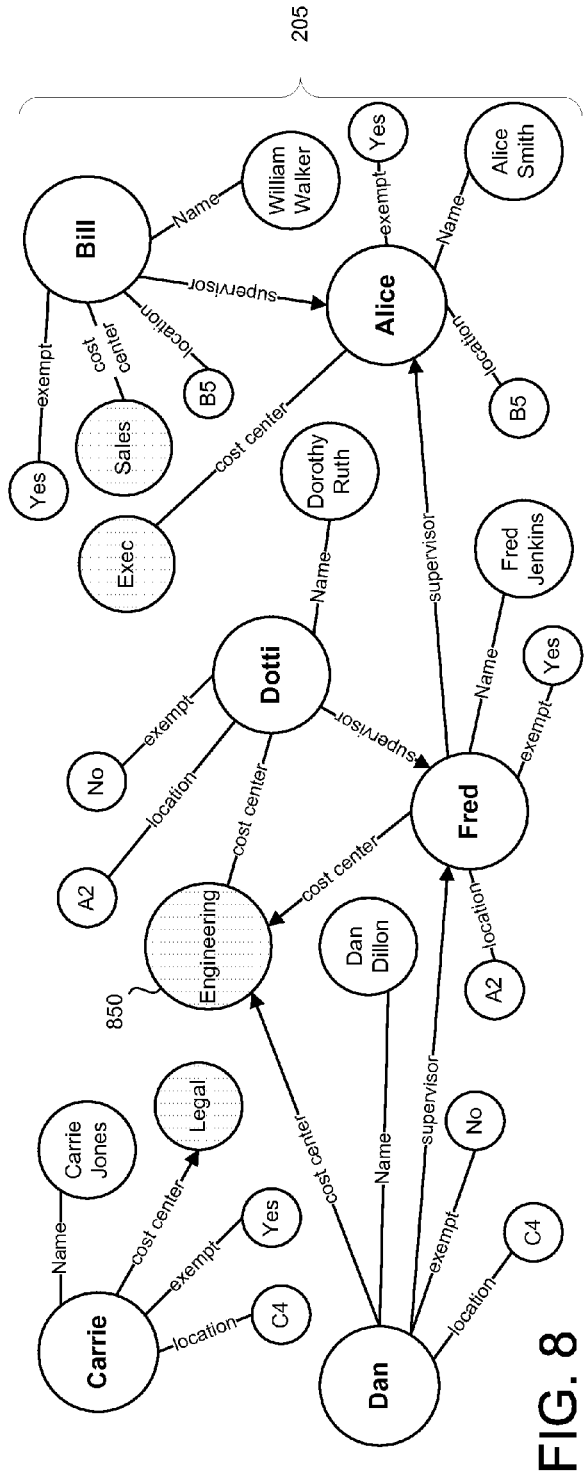
FIG. 8 illustrates an example of a user interface displaying related entities and entities of two different entity types, consistent with disclosed implementations.

FIG. 8 also illustrates an example of a user interface displaying related entities and entities of two different entity types, consistent with disclosed implementations. For example, in addition to the tabular user interface 805 for employee entities, the user interface 200 may also include a tabular user interface 810 for the newly generated cost center entities. In some implementations, the user interface 810 may be displayed when a user selects the column heading of "cost center" in the user interface 805. In some implementations, the user interface 810 may be generated in response to the conversion of the cost center properties to a new entity type in accordance with process 700 above. The user interfaces 805 and 810 may include a control that allows the user to add properties or relationships for an entity type. For example, the user interface 805 may include a control 815 selectable by the user. The control 815 may be a link, a button, or some other control that initiates a user interface that allows a user to add relationships to an entity. The user interface may include a blank column in the tabular display of user interface 810 or a pop-up window, etc. In an implementation with a blank column, the system may accept text strings for the column heading and for cell values in the column. The system may generate property entities representing the cell values and link them to corresponding entities via a relationship represented by the column heading. The user may then convert the property entities to document entities of an existing type or a new entity type as described above.

Figure 9:
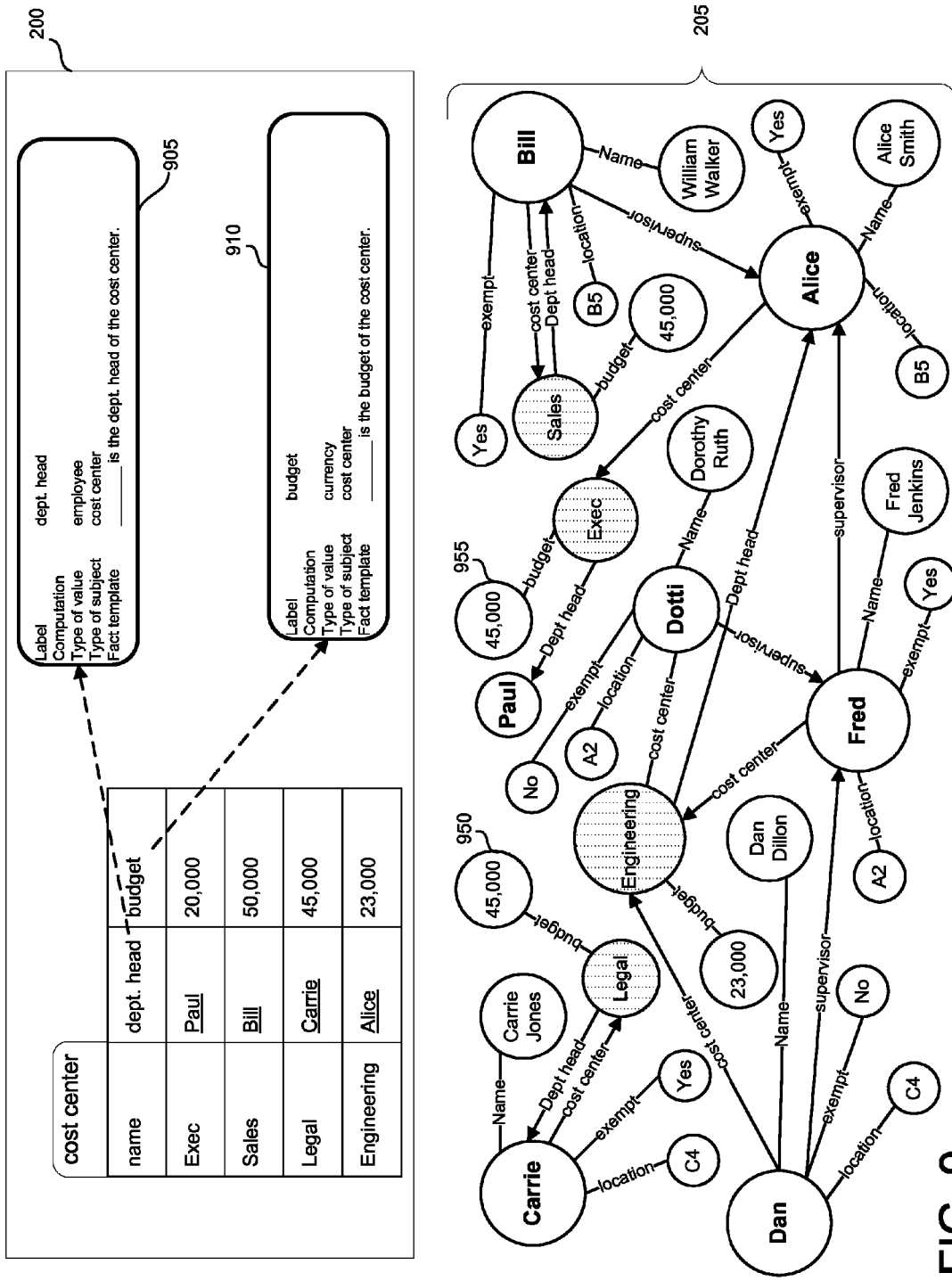
FIG. 9 illustrates an example of a user interface for adding properties to an entity type and generating relationships with existing entities, consistent with disclosed implementations.

In other implementations, the system may use a pop-up window to add properties and/or relationships between entities to an existing entity. FIG. 9 illustrates an example of a user interface for adding properties to an entity type and generating relationships with existing entities, consistent with disclosed implementations. For example, the system may generate user interface 905 when a user selects a control, e.g., control 815, for adding a new property or relationship to the cost center entity type. The user interface 905 may allow a user to enter a label for the relationship, enter a calculation for the property (if applicable), enter an object entity type, and a fact template. The subject entity type may be determined by the system. For example, the subject entity for user interface 805 is a cost center entity because user interface 905 was initiated in response to control 815 for the cost center user interface 810. The object type may be text, number, an existing entity type, or a new entity type, as described above. After the user has provided the information from user interface 905, the system may generate a new column in the tabular user interface 810. The user may then enter values for each entity. For example, the user may enter "Paul" for the Exec entity. In the example of FIG. 9, the object entity type is employee, so the value Paul entered by the user represents an employee entity. If this entity does not already exist, the system may ask the user whether a new entity is to be generated. If so, the system may generate the new entity. For example, the graph 205 of FIG. 9 illustrates a new employee entity for Paul that is linked to the Exec cost center entity by a dept. head relationship. If the entered value matches an existing entity, the system may generate a relationship between the entities. For example, the graph 205 of FIG. 9 illustrates a new dept. head relationship between the Engineering cost center entity and the existing Alice employee entity.

FIG. 9 also illustrates a user interface 910 that generates a new property entity for an existing entity. In the example of user interface 910, the object type is currency. This may be a known alpha-numeric type, so the system may generate property entities. For example, the system may generate property entity 950 that is linked to the Legal cost center entity by a budget relationship and property entity 955 that is linked to the Exec cost center entity by a budget relationship. In some implementations, the new relationship may be a computed relationship. A computed relationship is a relationship between entities that can be determined in real time based on properties, entities, and relationships stored in the knowledge document. The computed relationship may not actually be itself stored in the knowledge document. An example of a computed relationship is a gross profit per unit, where the knowledge document stores the unit cost and unit price.

FIG. 10 illustrates another example of a property that is a computed relationship. In the example of FIG. 10, the computed relationship includes a natural language description of the computation. The natural language description allows the user to use his or her own vocabulary to define the relationship. When a natural language computation is entered, the system may parse the computation to identify existing entity types, existing properties, and existing relationships to determine how to calculate the values for the tabular interface 1010. The system may use natural language processing and semantic-syntactic processing techniques to identify the entity types, properties, and relationships. In the example of FIG. 10, the computed relationship represents an inverse relationship. In a directed graph, an inverse relationship represents a link from the object entity to the subject entity. For example, if the supervisor relationship links a supervised employee to a supervisor employee, the inverse of the supervisor relationship links the supervisor employee to the supervised employees. The system may display the results of the computation in a column of the tabular interface 1010.

In some implementations, if a cell in the tabular interface 1010 includes more than one entity, the system may allow the user to step into the list of entities. FIG. 11 illustrates an example of a user interface 1105 that enables a user to step into a list of entities. In the example of FIG. 11, the user has selected the list of entities in tabular interface 1010 of FIG. 10. As a result, the system generates tabular interface 1105, which displays the properties and relationships for the Bill and Fred entities because these are the entities represented by the inverse relationship direct reports. The tabular display of user interface 1105 also includes controls that enable a user to step into lists and to display information for other entities. For example, the user may select the "Dan, Dotti" control in the tabular interface 1105, causing the system to generate another tabular display with the entity information for the Dan and Dotti entities.

Figure 12:
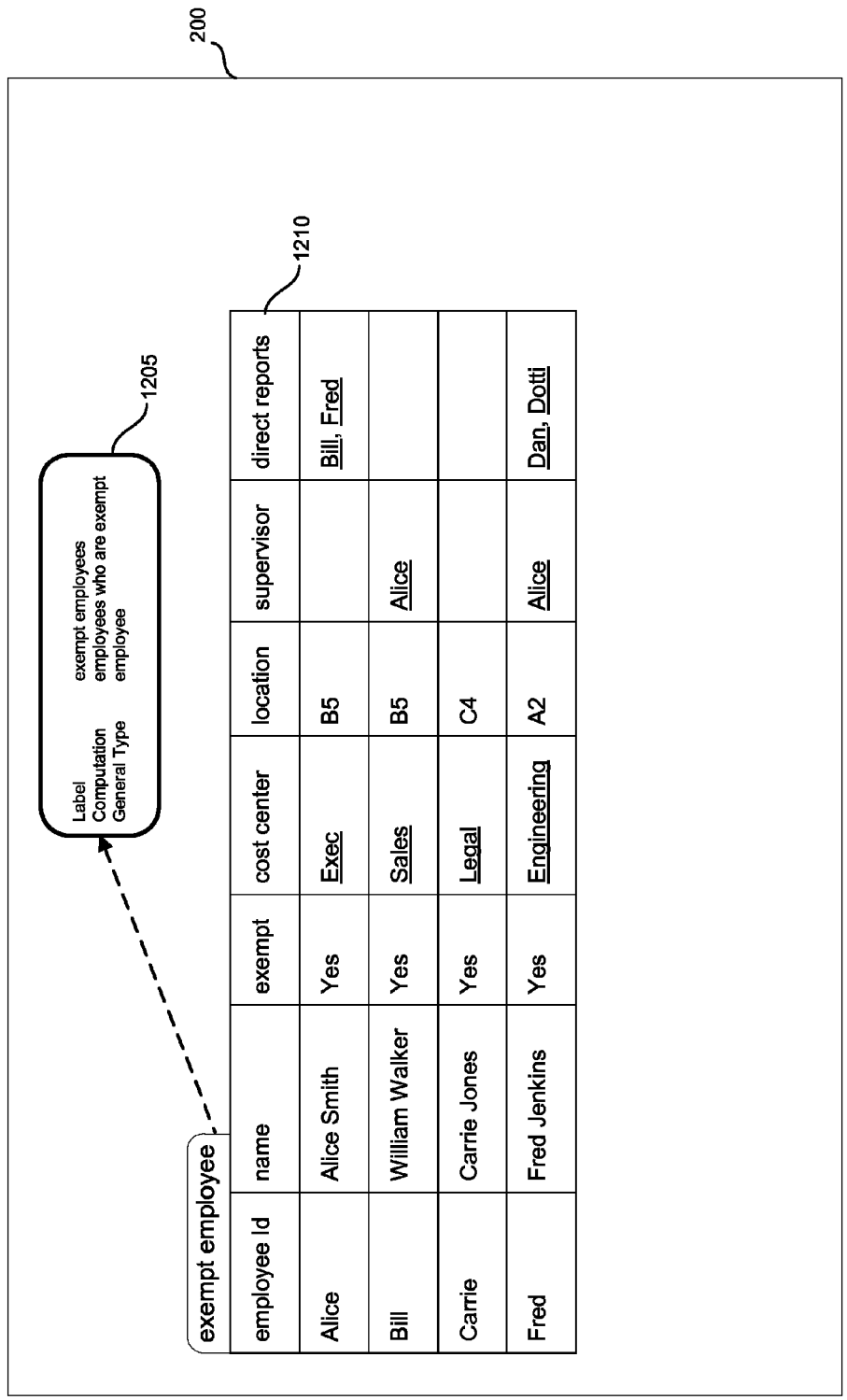
FIG. 12 illustrates an example of an entity subtype in a knowledge document, consistent with disclosed implementations.

FIG. 12 illustrates an example of a user interface for defining a subtype of an entity type for a knowledge document. A subtype may itself be an entity type in the knowledge document and may be associated with a more general entity type. The subtype may identify document entities of the more general type based on some criteria. The subtype may define additional properties or relationships that entities of the more general type can have in addition to the properties and relationship defined for the general type. A subtype may be a special entity in the knowledge document that is linked to document entities by an extension member relationship. The extension of an entity type is the set of instances of the entity type. The criteria for membership in the extension of the subtype may be based on a computation or based on express identification by a user. The user interface 1205 may enable a user to provide a name for the subtype. The user interface 1205 might optionally receive a general entity type for the subtype. The general entity type may indicate which document entities are eligible for membership in the extension of the subtype. The user may optionally specify a computation from which the general entity type and the criteria for selecting from instances of the general type may be determined. If the user leaves the computation blank, the user interface may allow a user to specify which document entities are instances of the subtype. In some implementations, the user interface used to add entities to an extension of the subtype may restrict entity selection to existing entities of the general type of the subtype. In some implementations, the system may allow a user to enter a new instance for the subtype. The new instance may not be a known instance of the more general entity type. In such implementations, the system may make the new instance of the subtype to also be a new instance of the more general type.

For example, when a user adds an instance of the employee entity type to the extension of the subtype, the system may display details about the entity in a tabular display, such as user interface 1205. If the user enters the optional computation, the system may automatically generate the members of the extension of the subtype. In the example of FIG. 12, the user entered a computation of "employees who are exempt." The system may parse the computation and determine that the employee entity type is the general type for the subtype and that employee entities with an exempt-*yes property are members of the extension of the subtype. The system may display details of the employee entities that are instances of the subtype. Subtypes that specify a computation may have extension membership determined when the subtype is displayed, queried, or otherwise accessed. In some implementations, an entity's membership in the extension of a subtype may be determined when an entity of the general type is added to the knowledge document, may be determined when the knowledge document is opened, etc. If extension membership is determined when accessed, extension links (e.g. an extension member relationship) might not be stored in the knowledge document.

Figure 13:
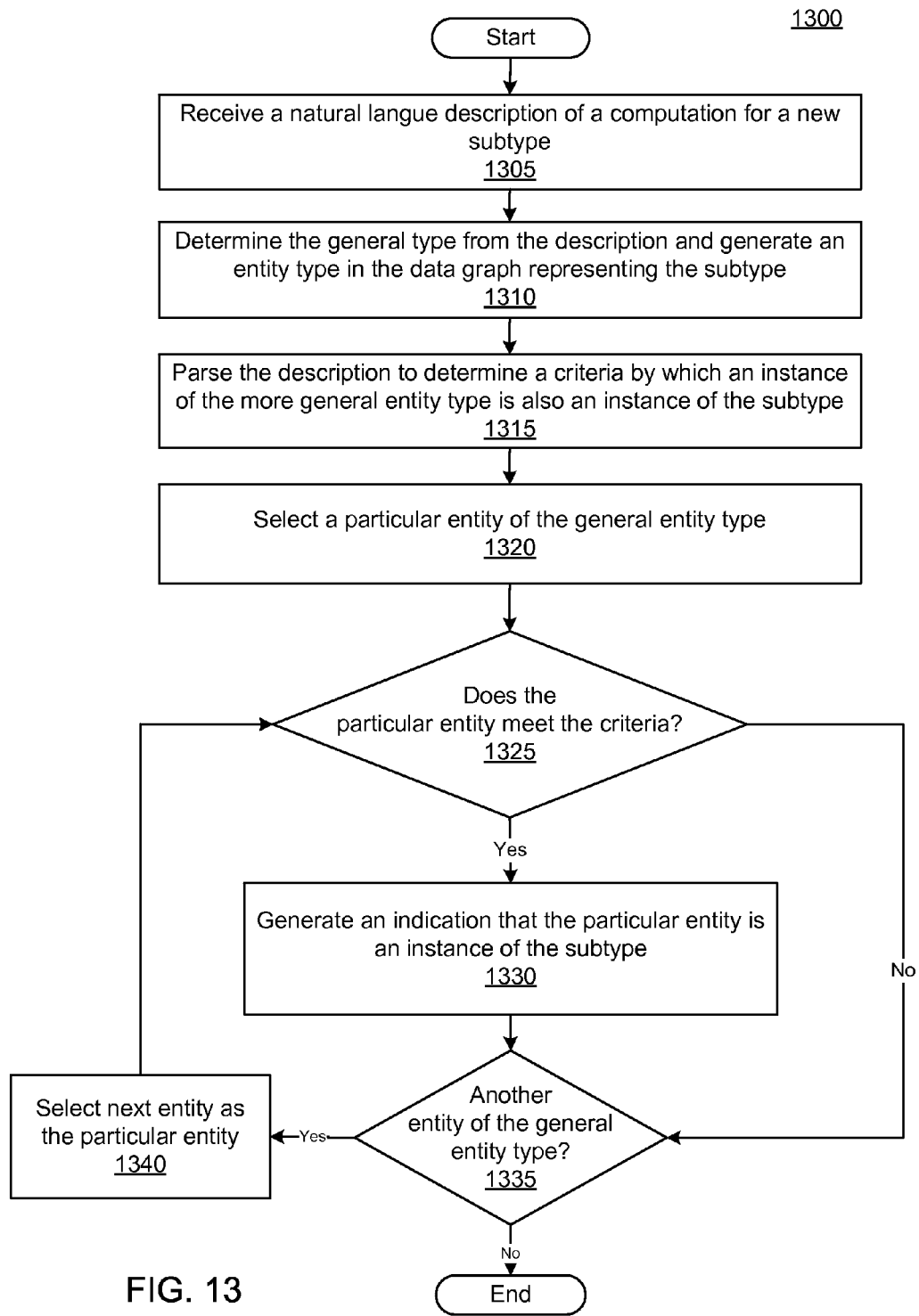
FIG. 13 illustrates a flow diagram of an example process for defining an extension of an entity subtype in the knowledge graph, in accordance with some implementations.

FIG. 13 illustrates a flow diagram of an example process 1300 for defining an entity subtype in the knowledge graph, in accordance with some implementations. Process 1300 may be performed by a graph building engine, such as graph building engine 114 of FIG. 1, in response to receipt of a new entity subtype defined by a natural language computation, such as the computation illustrated in user interface 1205 of FIG. 12. Process 1300 may support a user interface that displays details about an extension of an entity subtype, such as user interface 1210 of FIG. 12. The system may receive a name and computation for a new subtype (1305). The description of the computation may use the terms and vocabulary familiar to the user and may be in natural language format. Thus, the computation may in some respects describe the subtype. In some implementations, the system may determine the general entity type for the subtype from the description and generate an entity type in the knowledge document to represent the subtype (1310). The system may also parse the description of the computation to determine criteria by which an instance of the more general entity type is also an instance of the subtype (1315). The criteria may be a relationship and an expected object entity. The criteria may also be a property and property value. The expected object entity may be a property entity or any other kind of entity, depending on the relationship because the relationship identifies the expected object type. The criteria can be arbitrarily complex, for example including any quantity of properties and relationships. The criteria may also include logical operators (e.g., "and," "or", etc.), quantifiers (e.g., "at least one," "at most one"), etc. The computation may include a particular value that the object entity must match to satisfy the criteria. In the example of FIG. 12, the computation description is "employees who are exempt." Using this example, the system may use natural language processing techniques to determine that the general type is employee and members of this subtype are employee entities that have the property of being exempt.

The system may then examine entities of the general type to determine the extension of the subtype. For example, the system may select a particular document entity of the general entity type (1320). The system may then determine whether the particular entity meets the criteria for the subtype. The particular entity meets the criteria if it has the properties and/or relationships specified in the criteria. As indicated above, any quantity of properties and relationships may be specified and related by logical operators. If the particular entity meets the criteria of the subtype (1325, Yes), the system may generate an indication that the particular entity is an instance of the subtype (1330). In some implementations, the indication may be an extension member relationship in the knowledge document between the particular entity and the entity representing the subtype. In some implementations, the indication may be inclusion of the particular entity in a list, set, temporary data structure, etc., for the subtype. For example, the system may generate the extension of the subtype as needed and steps 1320 through 1340 may be performed in response to the access request for the subtype. If the particular entity does not match the subtype criteria (1325, No), or after generating the link (1330), the system may determine whether another document entity of the general entity type is to be evaluated (1335). If so (1335, Yes), the next entity is selected as the particular entity (1340) and steps 1325 to 1330 are repeated. When the system has analyzed all entity instances of the general type are examined (1335, No), process 1300 ends. The system may then use the subtype and its extension to generate a display such as 1205 of FIG. 12.

Figure 14:
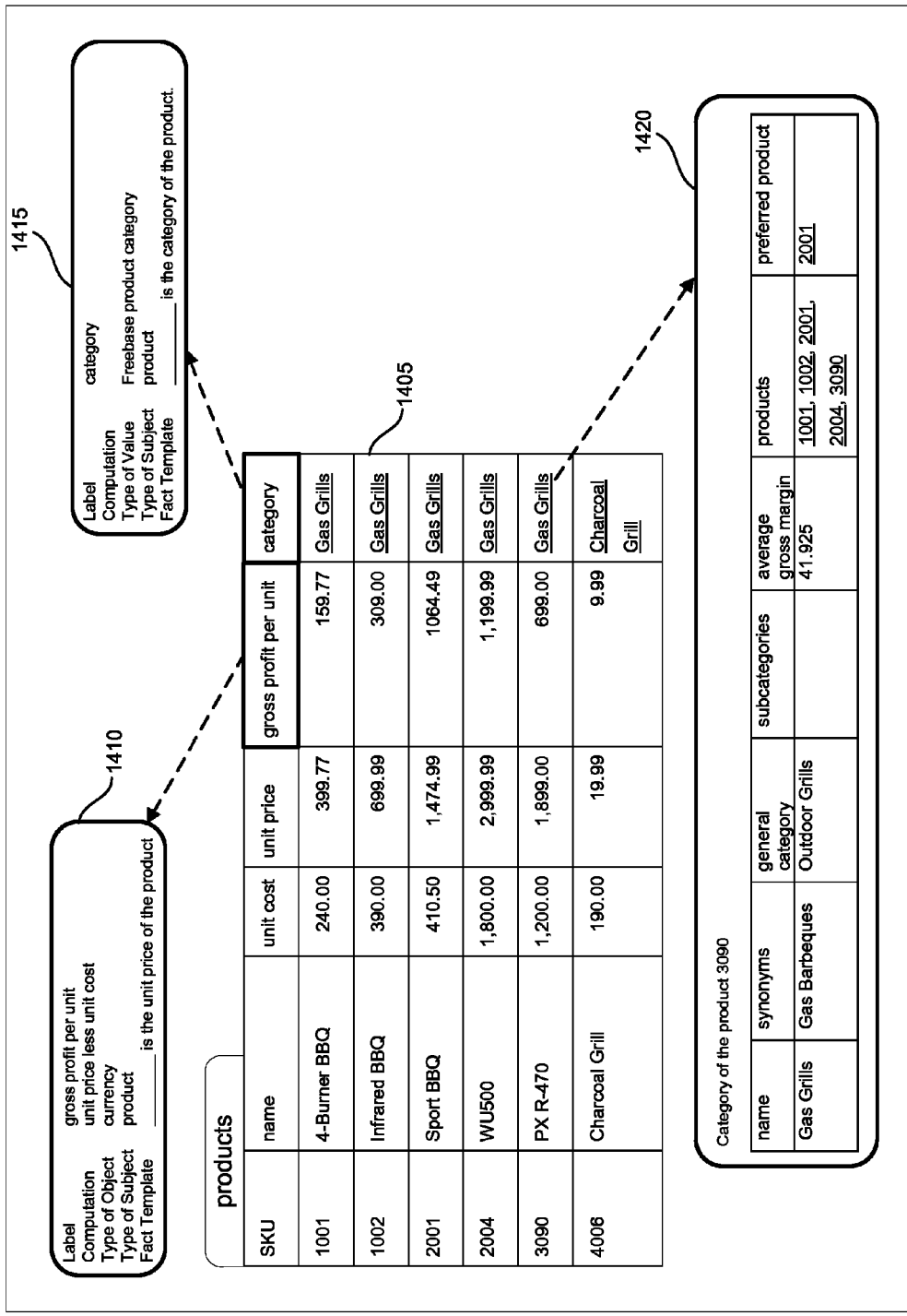
FIG. 14 illustrates linking a knowledge document to a public data graph, consistent with some implementations.

FIG. 14 illustrates an example user interface that links a knowledge document to a public data graph. The user interface 200 of FIG. 14 illustrates how the system may add links between document entities and entities in another graph, and add private properties to the entities in the other graph. In the example of interface 200 of FIG. 145, the knowledge document includes product entities. The product entities have four related properties, specifically name, unit cost, unit price, and gross profit per unit. In addition to the four properties, the user has added a link to a public data graph, specifically a product category entity that exists in the Freebase data graph. For example, in the user interface 1415 the user has added a category link to the products entity type. The category relationship links a product entity in the knowledge document, the subject, to a product category entity in the Freebase data graph, the object. It is understood that any public graph, any public knowledge document, or any other private knowledge document that a user has access to, may be identified as the type of object in user interface 1415. The cell entries in the "category" column of user interface 1405 may represent instances of an entity type in the Freebase data graph. In some implementations, the system may include a user interface for selecting the instances from the Freebase data graph after identifying the "Freebase product category" type as the type of value. The user interface 1405 may display the instances as links or with some other selectable control, indicating that the values represent entities that are not properties.

If a user selects one of the values, e.g., by clicking on the link for Gas Grills for product 3090, the system may generate user interface 1420. User interface 1420 may be a pop-up window, a window in a different tab, information displayed on a different portion of the user interface 200, or some other interface, that displays facts about the gas grills entity in the Freebase data graph. For example, the name, synonyms, general category, and subcategories may be facts obtained from information in the Freebase data graph. In addition, the knowledge document, e.g. the private data graph that includes the information about the products illustrated in user interface 1405, may also include private properties for the public entity type. For example, in addition to the four data items from the public data graph, the knowledge document may include an average gross margin property, a preferred product relationship, and an inverse relationship that displays all products under the category. The user may add these private properties and relationships using methods similar those discussed above with regard to FIGS. 8 and 9.

FIG. 14 also illustrates another example of a computed property. For example, in the user interface 1405 the gross profit per unit relationship is a property relationship. The interface 1405 may include a control, such as the column heading, that when selected may display relationship metadata for the relationship. In the example of FIG. 14, the metadata is displayed in user interface 1410. As illustrated, the metadata indicates that the values displayed in the gross profit per unit are calculated by subtracting the unit cost property from the unit price property. The system may use syntactic-semantic analysis as explained above to parse the computation and determine the properties and the operation used to compute the value. The "average gross margin" of user interface 1420 may also be a computed property, using similar techniques.

FIG. 15 shows an example of a generic computer device 1500, which may be system 100, computing device 110, and/or client 180 of FIG. 1, which may be used with the techniques described here. Computing device 1500 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1500 includes a processor 1502, memory 1504, a storage device 1506, and expansion ports 1510 connected via an interface 1508. In some implementations, computing device 1500 may include transceiver 1546, communication interface 1544, and a GPS (Global Positioning System) receiver module 1548, among other components, connected via interface 1508. Device 1500 may communicate wirelessly through communication interface 1544, which may include digital signal processing circuitry where necessary. Each of the components 1502, 1504, 1506, 1508, 1510, 1540, 1544, 1546, and 1548 may be mounted on a common motherboard or in other manners as appropriate.

The processor 1502 can process instructions for execution within the computing device 1500, including instructions stored in the memory 1504 or on the storage device 1506 to display graphical information for a GUI on an external input/output device, such as display 1516. Display 1516 may be a monitor or a flat touchscreen display. In some implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk. In some implementations, the memory 1504 may include expansion memory provided through an expansion interface.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium.

The computer program product may also contain instructions that, when executed, perform one or more methods, such as those described above. The computer- or machine-readable medium is a storage device such as the memory 1504, the storage device 1506, or memory on processor 1502.

The interface 1508 may be a high speed controller that manages bandwidth-intensive operations for the computing device 1500 or a low speed controller that manages lower bandwidth-intensive operations, or a combination of such controllers. An external interface 1540 may be provided so as to enable near area communication of device 1500 with other devices. In some implementations, controller 1508 may be coupled to storage device 1506 and expansion port 1514. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1530, or multiple times in a group of such servers. It may also be implemented as part of a rack server system. In addition, it may be implemented in a personal computer such as a laptop computer 1522, or smart phone 1536. An entire system may be made up of multiple computing devices 1500 communicating with each other. Other configurations are possible.

FIG. 16 shows an example of a generic computer device 1600, which may be system 100 of FIG. 1, which may be used with the techniques described here. Computing device 1600 is intended to represent various example forms of large-scale data processing devices, such as servers, blade servers, datacenters, mainframes, and other large-scale computing devices. Computing device 1600 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1600 may include any number of computing devices 1680. Computing devices 1680 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1680a includes multiple racks 1658a-1658n. Each rack may include one or more processors, such as processors 1652a-1652n and 1662a-1662n. The processors may include data processors, network attached storage devices, and other computer controlled devices. In some implementations, one processor may operate as a master processor and control the scheduling and data distribution tasks. Processors may be interconnected through one or more rack switches 1658, and one or more racks may be connected through switch 1678. Switch 1678 may handle communications between multiple connected computing devices 1600.

Each rack may include memory, such as memory 1654 and memory 1664, and storage, such as 1656 and 1666. Storage 1656 and 1666 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1656 or 1666 may be shared between multiple processors, multiple racks, or multiple computing devices and may include a computer-readable medium storing instructions executable by one or more of the processors. Memory 1654 and 1664 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1654 may also be shared between processors 1652a-1652n. Data structures, such as an index, may be stored, for example, across storage 1656 and memory 1654. Computing device 1600 may include other components not shown, such as controllers, buses, input/output devices, communications modules, etc.

An entire system, such as system 100, may be made up of multiple computing devices 1600 communicating with each other. For example, device 1680a may communicate with devices 1680b, 1680c, and 1680d, and these may collectively be known as system 100. As another example, system 100 of FIG. 1 may include one or more computing devices 1600 as graph building engine 114 the user interface 116. Furthermore, some of the computing devices may be located geographically close to each other, and others may be located geographically distant. The layout of system 1600 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor; and
   a memory storing:
   a data graph including a plurality of first entities of a first entity type, wherein the first entity type has a first property of an alpha-numeric type, wherein at least some of the first entities have respective alpha-numeric values for the first property, and
   instructions that, when executed by the at least one processor, cause the system to:
   generate data used to display the data graph in a tabular format, where entities of the first entity type are displayed in a first column and the first property is displayed in a second column,
   receive a selection of the second column,
   receive, responsive to the selection of the second column, a new entity type for the first property from a user,
   generate second entities having the new entity type, each second entity representing a unique alpha-numeric value for the first property from the respective alpha-numeric values, and
   for a particular first entity of the plurality of first entities:
   generate a labeled relationship in the data graph between the particular first entity and one of the second entities based on the alpha-numeric value of the first property for the particular first entity, the label being based on a heading of the second column, and
   upon generating the relationship, remove the first property from the particular first entity.

2. The system of claim 1, wherein the first property has a fact template, the fact template being automatically generated based on semantic analysis of a column heading of tabular data and values in the column.

3. The system of claim 1, wherein the memory further stores instructions that, when executed by the at least one processor, cause the system to:
   receive a subtype from the user for the first entity type and a natural language description for the subtype;
   generate an entity in the data graph that represents the subtype;
   parse the natural language description to determine criteria for the subtype; and
   determine that first entities meeting the criteria are members of an extension of the subtype.

4. The system of claim 3, wherein the criteria specifies a property, a relationship and an object entity, or at least two properties and a logical operator.

5. The system of claim 1, wherein the memory further stores instructions that, when executed by the at least one processor, cause the system to:
   receive a subtype for the first entity type;
   generate an entity that represents the subtype;
   receive an indication that a particular first entity is an instance of the subtype; and
   generate a relationship in the data graph between the particular first entity and the entity that represents the subtype.

6. The system of claim 1, wherein the memory further stores instructions that, when executed by the at least one processor, cause the system to:
   receive an existing entity type as the type for a second property;
   determine that a certain first entity has an alpha-numeric value for the second property that corresponds to an entity of the existing entity type;
   generate a relationship in the data graph between the certain first entity and the entity of the existing entity type, the relationship representing the second property; and
   remove the second property from the certain first entity.

7. The system of claim 1, further comprising a user interface that generates information used to display the first entities, the information for each first entity including:
   alpha-numeric values for the first entity for each associated property; and
   entities related to the first entity.

8. The system of claim 7, wherein the entities related to the first entity appear as links that enable the user of the user interface to initiate display of information for the related entities.

9. The system of claim 7, wherein the user interface further generates information used to display the entity types in the data graph and to select one of the entity types as the first entity type.

10. The system of claim 1, the memory further stores instructions that, when executed by the at least one processor, cause the system to:
    receive a second entity type for a second property, the second entity type being an entity type from an external data graph; and
    for each of the plurality of first entities with a second alpha-numeric value for the second property:
    match the second alpha-numeric value to an entity in the external data graph that has the second entity type, and
    generate a relationship in the data graph between the first entity and the entity in the external data graph.

11. The system of claim 10, further comprising a user interface that generates information used to display the first entities, the information for each first entity including:
    alpha-numeric values for properties associated with the first entity; and
    entities related to the first entity, including the entities in the external data graph.

12. The system of claim 10, further comprising a user interface that adds properties in the data graph for the entities in the external data graph.

13. A method comprising:
    generating, using at least one processor, data used to display tabular data to a user, a first column of the tabular data being associated with a first entity type and non-heading rows in the tabular data representing entities of the first entity type in a knowledge document;
    permitting the user to select a second column of the tabular data and provide a second entity type as an object type to be associated with a labeled relationship represented by a heading of the second column;

generating, using the at least one processor, an entity in the knowledge document of the second entity type that represents a value in a non-heading row in the tabular data;

linking an entity of the first entity type that is associated with a non-heading row to the generated entity by the relationship; and storing an updated knowledge document in a memory.

14. The method of claim 13, further comprising:
modifying a display of the tabular data responsive to storing the updated knowledge document so that values in the second column are selectable.

15. The method of claim 13, further comprising:
permitting the user to select a third column of the tabular data and provide the entity type as an object type to be associated with a relationship represented by the third column;

for each non-heading row:
  determining that the third column for the non-heading row has a value,
  identifying a second entity of the first entity type that corresponds to the value,
  and linking a first entity of the first entity type that is associated with the non-heading row to the second entity using the relationship represented by the third column; and storing updates to the knowledge document in the memory.

16. The method of claim 13, further comprising:
receiving a natural language computation for a subtype, the subtype being associated with the first entity type;
parsing the natural language computation to determine criteria for the subtype;
determining a plurality of entities of the first entity type meet the criteria; and
displaying the plurality of entities in a tabular display for the subtype.

17. The method of claim 13, wherein the second entity type does not exist prior to the user selecting the second column.

18. The method of claim 13, further comprising:
receiving an identification of the tabular data from the user;
defining the first entity type based on an initially occurring column of data in the tabular data;
generating the entities of the first entity type based on row values in the initially occurring column of data;
generating properties associated with the entities of the first entity type based on row values in remaining columns of data; and
storing the entities and their associated properties as the knowledge document.

19. The method of claim 13, further comprising:
permitting the user to add a new column to the tabular data by supplying a name and a natural language computation, the natural language computation identifying a particular relationship;
parsing the computation to determine the particular relationship;
determining that the computation specifies an inverse relationship;
determining a plurality of entities that satisfy the inverse relationship for a second entity of the first entity type; and
displaying representations for the plurality of entities as values for the new column in a row of the tabular display associated with the second entity of the first entity type.

20. The method of claim 13, further comprising:
permitting the user to add a new column to the tabular data by supplying a name and identifying a third entity type from a data graph distinct from the knowledge document; and
permitting the user to associate an entity from the data graph with an entity of the first entity type using a relationship represented by the new column.

21. A computer-implemented method comprising:
storing a first data graph in memory of a computing device, the first data graph including a plurality of first entities of a first entity type, wherein the first entity type has one or more associated properties, a first property of the one or more properties having a text type, wherein at least some of the first entities have respective values for the first property;
receiving an entity type for the first property;
determining that the received entity type is from a second data graph; and
for each of the plurality of first entities with a value for the first property:
  matching the value to an entity in the second data graph that has the received entity type, and
  generating a relationship in the first data graph between the first entity and the entity in the second data graph.

22. The method of claim 21, further comprising:
receiving a new property for association with the entity type from the second data graph;
receiving a value for the new property associated for a particular entity in the second data graph; and
storing the value for the new property as part of the first data graph, wherein the new property and the value for the new property are unknown to second data graph.

23. The method of claim 22, further comprising:
generating data used to display property values associated with the entity from the second data graph and the value for the new property.

* * * * *